(12) United States Patent
Chun et al.

(10) Patent No.: US 11,840,601 B2
(45) Date of Patent: Dec. 12, 2023

(54) COMPOSITION OF ALKOXYSILYL-FUNCTIONALIZED EPOXY RESIN AND COMPOSITE THEREOF

(71) Applicant: KOREA INSTITUTE OF INDUSTRIAL TECHNOLOGY, Cheonan (KR)

(72) Inventors: Hyun Aee Chun, Suwon (KR); Sook Yeon Park, Gunpo (KR); Su Jin Park, Osan (KR); Yun Ju Kim, Seoul (KR)

(73) Assignee: KOREA INSTITUTE OF INDUSTRIAL TECHNOLOGY, Cheonan (KR)

( * ) Notice: Subject to any disclaimer, the term of this patent is extended or adjusted under 35 U.S.C. 154(b) by 396 days.

(21) Appl. No.: 17/088,354

(22) Filed: Nov. 3, 2020

(65) Prior Publication Data

US 2021/0163673 A1 Jun. 3, 2021

(30) Foreign Application Priority Data

Nov. 15, 2019 (KR) ........................ 10-2019-0147020

(51) Int. Cl.
| | |
|---|---|
| *C08G 59/30* | (2006.01) |
| *C08G 59/32* | (2006.01) |
| *C08L 63/00* | (2006.01) |
| *C08F 220/18* | (2006.01) |
| *C08F 220/56* | (2006.01) |
| *C08G 59/24* | (2006.01) |
| *C08G 59/42* | (2006.01) |
| *C08G 59/68* | (2006.01) |
| *C08K 3/22* | (2006.01) |
| *C08K 3/36* | (2006.01) |
| *C08L 63/04* | (2006.01) |

(52) U.S. Cl.
CPC .... *C08G 59/3281* (2013.01); *C08F 220/1802* (2020.02); *C08F 220/1804* (2020.02); *C08F 220/56* (2013.01); *C08G 59/245* (2013.01); *C08G 59/306* (2013.01); *C08G 59/4269* (2013.01); *C08G 59/686* (2013.01); *C08K 3/22* (2013.01); *C08K 3/36* (2013.01); *C08L 63/04* (2013.01); *C08K 2003/2227* (2013.01); *C08K 2201/005* (2013.01); *C08L 2203/20* (2013.01); *C08L 2203/30* (2013.01)

(58) Field of Classification Search
CPC .... C08G 59/306; C08G 59/3281; C08L 63/00
USPC .......................................... 523/433, 440, 443
See application file for complete search history.

(56) References Cited

U.S. PATENT DOCUMENTS

| | | | |
|---|---|---|---|
| 3,935,346 A | 1/1976 | Stengle et al. | |
| 4,220,513 A | 9/1980 | Green et al. | |
| 4,292,151 A | 9/1981 | Inata et al. | |
| 4,498,957 A | 2/1985 | Sasaki et al. | |
| 4,789,711 A | 12/1988 | Monnier et al. | |
| 5,019,607 A | 5/1991 | Coltrain et al. | |
| 5,248,710 A | 9/1993 | Shiobara et al. | |
| 5,266,612 A | 11/1993 | Kim et al. | |
| 5,300,588 A | 4/1994 | Shiobara et al. | |
| 5,336,786 A | 8/1994 | Shiobara et al. | |
| 5,478,871 A | 12/1995 | Takebe et al. | |
| 6,001,907 A | 12/1999 | Huang | |
| 6,087,513 A | 7/2000 | Ciao et al. | |
| 6,160,040 A | 12/2000 | Ghosh | |
| 6,174,967 B1 | 1/2001 | Soucek et al. | |
| 6,462,141 B1 | 10/2002 | Kim et al. | |
| 6,525,160 B1 | 2/2003 | Goda et al. | |
| 6,534,601 B1 | 3/2003 | Park et al. | |
| 7,034,089 B2 | 4/2006 | Herr et al. | |
| 7,223,821 B2 | 5/2007 | Okuhira et al. | |
| 7,408,015 B2 | 8/2008 | Kang et al. | |
| 7,498,085 B2 | 3/2009 | Kashiwagi et al. | |
| 7,521,511 B2 | 4/2009 | Tanaka et al. | |
| 7,696,286 B2 | 4/2010 | Endo et al. | |
| 7,785,715 B2 | 8/2010 | Tsumura et al. | |
| 8,062,468 B2 | 11/2011 | Finter et al. | |
| 8,084,130 B2 | 12/2011 | Hamada et al. | |
| 8,124,715 B2 | 2/2012 | Tanaka et al. | |
| 8,168,731 B2 | 5/2012 | Satou et al. | |

(Continued)

FOREIGN PATENT DOCUMENTS

| | | |
|---|---|---|
| CN | 1293685 A | 5/2001 |
| CN | 1303382 A | 7/2001 |
| CN | 1784462 A | 6/2006 |
| CN | 101701058 A | 5/2010 |
| EP | 0022073 A1 | 1/1981 |
| EP | 0282977 A2 | 9/1988 |
| EP | 0618246 A2 | 10/1994 |
| EP | 1114834 A1 | 7/2001 |
| EP | 1137328 A2 | 9/2001 |
| EP | 2119721 A1 | 11/2009 |
| EP | 2343597 A2 | 7/2011 |
| EP | 2767535 A2 | 8/2014 |

(Continued)

OTHER PUBLICATIONS

Extended European Search Report for European Patent Application No. 18204761.3 dated Apr. 10, 2019.

(Continued)

*Primary Examiner* — Michael J Feely

(57) ABSTRACT

An epoxy composition, a composite thereof, and an article including the same, in which the reactivity of the epoxy resin having an alkoxysilyl group is improved by a specific acrylic-based polymer resin, are provided. According to the present disclosure, an epoxy composition comprising an epoxy resin having an alkoxysilyl group, an acrylic-based polymer resin, and an inorganic filler, a composite thereof, and an article including the same are provided. The epoxy composition of the present disclosure shows an excellent thermal expansion property in a composite, and may be used in manufacture of semiconductor packaging and/or electrical and electronic components.

17 Claims, 1 Drawing Sheet

(56) References Cited

U.S. PATENT DOCUMENTS

| | | | |
|---|---|---|---|
| 2002/0089071 A1* | 7/2002 | Sumita | H01L 23/293 257/793 |
| 2003/0078322 A1 | 4/2003 | Honda et al. | |
| 2004/0122186 A1 | 6/2004 | Herr et al. | |
| 2004/0166241 A1 | 8/2004 | Gallo et al. | |
| 2004/0241331 A1 | 12/2004 | Durairaj et al. | |
| 2005/0119381 A1 | 6/2005 | Tanaka et al. | |
| 2006/0009577 A1 | 1/2006 | Hara | |
| 2006/0205891 A1 | 9/2006 | Tanaka et al. | |
| 2006/0214153 A1 | 9/2006 | Ikezawa et al. | |
| 2007/0100043 A1 | 5/2007 | Shiono | |
| 2007/0282081 A1 | 12/2007 | Ichiroku | |
| 2008/0214734 A1 | 9/2008 | Yang et al. | |
| 2008/0221238 A1 | 9/2008 | Su et al. | |
| 2008/0234409 A1 | 9/2008 | Akagi et al. | |
| 2008/0255354 A1 | 10/2008 | Popp et al. | |
| 2008/0319142 A1 | 12/2008 | Kikkawa et al. | |
| 2009/0004484 A1 | 1/2009 | Kim et al. | |
| 2009/0286924 A1 | 11/2009 | Tsuchida | |
| 2011/0020555 A1 | 1/2011 | Wothke et al. | |
| 2011/0082321 A1 | 4/2011 | Sakurai et al. | |
| 2011/0098380 A1 | 4/2011 | Hearn et al. | |
| 2011/0143092 A1 | 6/2011 | Asai et al. | |
| 2011/0244326 A1 | 10/2011 | Murase et al. | |
| 2011/0259628 A1 | 10/2011 | Satou et al. | |
| 2011/0319589 A1 | 12/2011 | Takeyama et al. | |
| 2012/0041102 A1 | 2/2012 | Chun et al. | |
| 2012/0153512 A1 | 6/2012 | Sugimoto et al. | |
| 2012/0248498 A1 | 10/2012 | Takenaka et al. | |
| 2012/0292487 A1 | 11/2012 | Yukawa et al. | |
| 2012/0295199 A1 | 11/2012 | Takeyama et al. | |
| 2012/0315765 A1 | 12/2012 | Nakajima et al. | |
| 2014/0100320 A1 | 4/2014 | Nagano et al. | |
| 2014/0179836 A1 | 6/2014 | Chun et al. | |
| 2015/0051316 A1 | 2/2015 | Chun et al. | |
| 2015/0105493 A1 | 4/2015 | Chun et al. | |
| 2015/0203626 A1 | 7/2015 | Chun et al. | |
| 2015/0247033 A1 | 9/2015 | Chun et al. | |
| 2015/0361211 A1 | 12/2015 | Chun et al. | |
| 2019/0135970 A1 | 5/2019 | Chun et al. | |

FOREIGN PATENT DOCUMENTS

| | | |
|---|---|---|
| EP | 2826777 A1 | 1/2015 |
| EP | 2835373 A1 | 2/2015 |
| EP | 2933257 A1 | 10/2015 |
| EP | 2960245 A1 | 12/2015 |
| JP | S57016446 A | 1/1982 |
| JP | S57141447 A | 9/1982 |
| JP | S61272244 A | 12/1986 |
| JP | S62050312 A | 3/1987 |
| JP | S62292828 A | 12/1987 |
| JP | S63227621 A | 9/1988 |
| JP | S63280720 A | 11/1988 |
| JP | S63280778 A | 11/1988 |
| JP | H06345847 A | 12/1994 |
| JP | H07258240 A | 10/1995 |
| JP | H08193091 A | 7/1996 |
| JP | H10045871 A | 2/1998 |
| JP | 3077695 B1 | 8/2000 |
| JP | 2003040970 A | 2/2003 |
| JP | 2003048953 A | 2/2003 |
| JP | 2003055435 A | 2/2003 |
| JP | 2003141933 A | 5/2003 |
| JP | 2004210977 A | 7/2004 |
| JP | 2005158766 A | 6/2005 |
| JP | 2005281528 A | 10/2005 |
| JP | 2006012784 A | 1/2006 |
| JP | 2006511664 A | 4/2006 |
| JP | 2006137800 A | 6/2006 |
| JP | 2006169368 A | 6/2006 |
| JP | 2006176732 A | 7/2006 |
| JP | 2006321216 A | 11/2006 |
| JP | 2007126496 A | 5/2007 |
| JP | 2007-197518 A | 8/2007 |
| JP | 2009043678 A | 2/2009 |
| JP | 2009275015 A | 11/2009 |
| JP | 2010003897 A | 1/2010 |
| JP | 2010065161 A | 3/2010 |
| JP | 2010520952 A | 6/2010 |
| JP | 2010229212 A | 10/2010 |
| JP | 2011001483 A | 1/2011 |
| JP | 2011057755 A | 3/2011 |
| JP | 2011116745 A | 6/2011 |
| JP | 2011208120 A | 10/2011 |
| JP | 2011225740 A | 11/2011 |
| JP | 2012129010 A | 7/2012 |
| JP | 5009535 B2 | 8/2012 |
| JP | 2012246422 A | 12/2012 |
| JP | 2012246425 A | 12/2012 |
| JP | 5297598 B2 | 9/2013 |
| JP | 2015-535814 A | 12/2015 |
| JP | 2016-511250 A | 4/2016 |
| JP | 2017-181890 A | 10/2017 |
| JP | 2018041889 A | 3/2018 |
| KR | 1019930007997 A | 5/1993 |
| KR | 1019990063076 A | 7/1999 |
| KR | 1020000038717 A | 7/2000 |
| KR | 1020000061084 A | 10/2000 |
| KR | 1020000062386 A | 10/2000 |
| KR | 1020010096438 A | 11/2001 |
| KR | 1020030034854 A | 5/2003 |
| KR | 1020040061557 A | 7/2004 |
| KR | 1020050058727 A | 6/2005 |
| KR | 1020050123140 A | 12/2005 |
| KR | 100587480 B1 | 6/2006 |
| KR | 1020060076417 A | 7/2006 |
| KR | 1020060077959 A | 7/2006 |
| KR | 1020060129517 A | 12/2006 |
| KR | 100673630 B1 | 1/2007 |
| KR | 1020070068299 A | 6/2007 |
| KR | 100835784 B1 | 6/2008 |
| KR | 1020080106051 A | 12/2008 |
| KR | 1020080108408 A | 12/2008 |
| KR | 100886331 B1 | 3/2009 |
| KR | 100929380 B1 | 12/2009 |
| KR | 1020100027245 A | 3/2010 |
| KR | 1020100117543 A | 11/2010 |
| KR | 1020100126490 A | 12/2010 |
| KR | 1020110008212 A | 1/2011 |
| KR | 1020110043719 A | 4/2011 |
| KR | 1020110104918 A | 9/2011 |
| KR | 1020120100506 A | 9/2012 |
| KR | 1020130023168 A | 3/2013 |
| KR | 1020130048185 A | 5/2013 |
| KR | 1020130111299 A | 10/2013 |
| KR | 1020130112007 A | 10/2013 |
| KR | 1020130135733 A | 12/2013 |
| KR | 1020140009029 A | 1/2014 |
| KR | 1020140036983 A | 3/2014 |
| KR | 1020140106441 A | 9/2014 |
| KR | 1020150098559 A | 8/2015 |
| KR | 1020150105213 A | 9/2015 |
| KR | 101596880 B1 | 2/2016 |
| KR | 101937994 B1 | 1/2019 |
| KR | 101967155 B1 | 4/2019 |
| WO | WO9531512 A1 | 11/1995 |
| WO | WO9962894 A2 | 12/1999 |
| WO | WO2004094499 A1 | 11/2004 |
| WO | WO2006025278 A1 | 3/2006 |
| WO | WO2007111606 A1 | 10/2007 |
| WO | WO2008041555 A1 | 4/2008 |
| WO | WO2008112150 A1 | 9/2008 |
| WO | WO2010092947 A1 | 8/2010 |
| WO | WO2011093188 A1 | 8/2011 |
| WO | WO2011093219 A1 | 8/2011 |
| WO | WO2011093236 A1 | 8/2011 |
| WO | WO2011102470 A1 | 8/2011 |
| WO | WO2011142468 A1 | 11/2011 |
| WO | WO2012070637 A1 | 5/2012 |
| WO | WO2013180375 A1 | 12/2013 |

(56) References Cited

FOREIGN PATENT DOCUMENTS

| WO | WO2014042491 A1 | 3/2014 |
| WO | WO2014129877 A1 | 8/2014 |

OTHER PUBLICATIONS

International Search Report and Written Opinion for PCTKR2015002138 dated Aug. 7, 2015.
Non-final Office Action for U.S. Appl. No. 16/181,351 dated Jun. 29, 2020.
Arkles, "Silane Coupling Agents: Connecting Across Boundaries," Gelest Inc., 2006, pp. 1-56.
Bayramoglu et al., "Synthesis and characterization of UV-curable dual hybrid oligomers based on epoxy acrylate containing pendant alkoxysilane groups," Progress in Organic Coatings, Jun. 2, 2006, pp. 50-55, vol. 57, Marmara University, Faculty of Art & Science, Department of Chemistry, Istanbul, Turkey.
Chun et al., "Curing mechanism of alkoxysilyl-functionalized epoxy(II): Effect of catalyst on the epoxy chemistry," Polymer, Apr. 5, 2019. pp. 272-282, vol. 172.
Search Report dated Feb. 12, 2016 for European Application 13813009.1.
Search Report dated Jun. 10, 2016 for European Application 13837901.1.
Search Report dated Sep. 6, 2016 for European Application 14754737.6.
Search Report dated Oct. 16, 2015 for European Application 13772355.7.
Search Report dated Dec. 9, 2015 for European Application 13796871.5.
Fraga et al., "Influence of the Filler CaCO3 on the Cure Kinetic of the Epoxy Network Diglycidyl Ether of Bisphenol a (BADGE n = 0) With Isophorone Diamine," Journal of Applied Polymer Science, Aug. 12, 2009, pp. 3338-3342, vol. 114, Issue 5, Wiley Periodicals, Inc.
Ho et al., "Modification of epoxy resin with siloxane containing phenol aralkyl epoxy resin for electronic encapsulation application," European Polymer Journal, 2001, pp. 267-274, vol. 37, Elsevier Science Ltd.
Ichiro, "Relation between Chemical Structures and Characteristics on Epoxy Resins," DIC Technical Review No. 7, 2001, pp. 1-12.
Ichiro, "State-of the-arts Technologies of Hyper Epoxy Resins beyond History," DIC Technical Review No. 11, 2005, pp. 21-28.
Search Report dated Jan. 28, 2014 for PCT Application No. PCT/KR2013/008439.
Search Report dated Feb. 25, 2013 for PCT Application PCT No. PCT/KR2012/006832.
Search Report dated Mar. 20, 2013 for PCT Application No. PCT/KR2012/009130.
Search Report dated May 11, 2015 for PCT Application No. PCT/KR2015/001605.
Search Report dated Jun. 26, 2013 for PCT Application No. PCT/KR2013/001211.
Search Report dated Jul. 9, 2013 for PCT Application No. PCT/KR2013/002062.
Search Report dated Aug. 27, 2013 for PCT Application No. PCT/KR2013/002730.
Li et al., "Preparation and Characterization of UV-Cured Hybrid Coatings by Triethoxysilane-Modified Dimethacrylate Based on Bisphenol-S Epoxy," Journal of Applied Polymer Science, Jan. 15, 2013, pp. 2189-2195, vol. 129, Issue 4, State Key Laboratory of Chemical Resource Engineering, Beijing, China.
Office Action dated Feb. 28, 2015 for Chinese Application 201280052291.8.
Office Action dated May 20, 2015 for Chinese Application 201280053687.4.
Office Action dated Jul. 10, 2017 for U.S. Appl. No. 14/390,340.
Office Action dated Jul. 19, 2017 for U.S. Appl. No. 14/404,942.
Office Action dated Nov. 2, 2015 for Chinese Application 201380046568.0.
Oturakli, "Characterization and Corrosion Performance of y-Glycidoxypropyltrimethoxysilane Modified Epoxy Polymer," Jul. 13, 2010, pp. 1-61, a Thesis, Graduate School of Engineering and Sciences of Izmir Institute of Technology, Izmir, Turkey.
"Polymer Synthesis," Experimental Chemistry Course (4th edition), May 6, 1992, pp. 431-438, Ebihara Kumao, Maruzen Inc., Tokyo.
Razzaq et al., "Investigating the Existence of Nonthermal/Specific Microwave Effects Using Silicon Carbide Heating Elements as Power Modulators," The Journal of Organic Chemistry, May 1, 2008, pp. 6321-6329, vol. 73, No. 16, American Chemical Society.
Suzuki et al., "Concise Encyclopedia of Polymer Science and Engineering," Polymer Dictionary, 1994, pp. 455-456, Maruzen Inc., Japan.
Xue et al., "Precise Synthesis of Poly(silphenylenesiloxane)s with Epoxy Side Functional Groups by Tris (pentafluorophenyl)borane as a Catalyst," Polymer Journal, 2007, pp. 379-388, vol. 39, No. 4, The Society of Polymer Science, Japan.
Zhang et al., "Characterization of Siliconized Diallyl Bisphenol a Type Epoxy Resin and Study on Its Curing Properties," Chemistry and Adhesion, Jun. 28, 2006, pp. 369-371 & 375, vol. 28, No. 6, Huaxue Yu Nianhe Bianji Weiyuanhui.
Zhao et al., "Review of polymer materials with low dielectric constant," Society of Chemical Industry, 2010, pp. 597-606, vol. 59.

\* cited by examiner

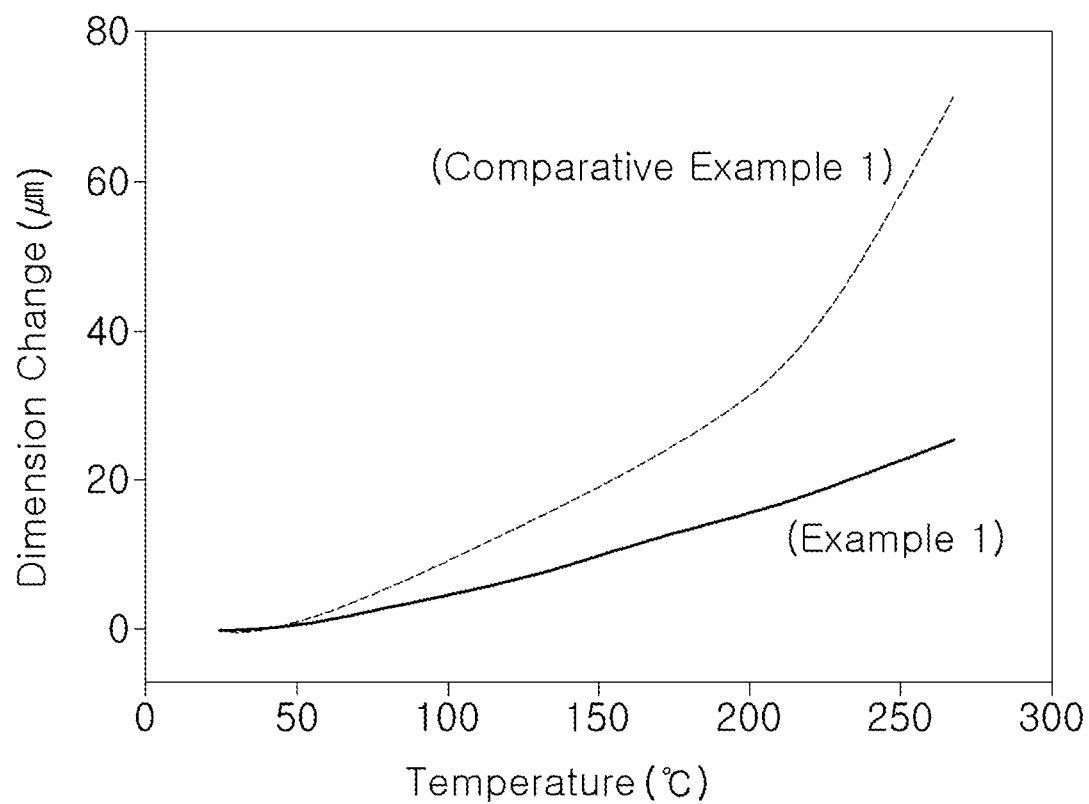

COMPOSITION OF ALKOXYSILYL-FUNCTIONALIZED EPOXY RESIN AND COMPOSITE THEREOF

CROSS-REFERENCE TO RELATED APPLICATION(S)

This application claims benefit of priority to Korean Patent Application No. 10-2019-0147020 filed on Nov. 15, 2019 in the Korean Intellectual Property Office, the disclosure of which is incorporated herein by reference in its entirety.

BACKGROUND

1. Field

The present disclosure relates to an epoxy composition including an epoxy resin having an alkoxysilyl group and a specific acryl-based polymer resin, a composite thereof, and an article including the same. More particularly, the present disclosure relates to an epoxy composition having improved thermal expansion properties of an epoxy having an alkoxysilyl group by a specific acryl-based polymer resin, a composite thereof, and an article including the same.

2. Description of Related Art

Since an epoxy material has excellent mechanical properties, electrical insulation, heat resistance, water resistance, adhesive properties, and so on, it is widely used as a coating material, a printed wiring board, an IC encapsulant, electrical and electronic components, an adhesive, and so on. However, reliability and processability of semiconductor packages are significantly limited due to a high coefficient of thermal expansion of the epoxy material in a semiconductor packaging. Therefore, research on lowering the coefficient of thermal expansion of the epoxy material has been continuously conducted. Nevertheless, the coefficient of thermal expansion (CTE) of the epoxy material is still higher than a required level.

In the case of an epoxy material used as a semiconductor packaging material, silica may be highly filled therein up to >90 wt % or more, in order to lower the thermal expansion property of an epoxy. Nevertheless, a CTE-mismatch problem with a semiconductor chip is still not solved due to high CTE of an epoxy composite. In addition, when silica is highly filled therein, a viscosity and a modulus of the epoxy material are increased and brittleness is increased. Meanwhile, with the advance of semiconductor packaging, it is difficult to increase a silica content. That is, a viscosity of an encapsulant should be lowered, and flexibility of an epoxy composite is required in the case of a film/sheet type product. Accordingly, the importance of an epoxy material which is capable of achieving low thermal expansion properties without increasing the silica content is ever increasing.

Meanwhile, the present inventors developed 'an epoxy compound having an alkoxysilyl group' as an epoxy compound (that is, an epoxy resin) having improved thermal expansion properties (see Korean Patent Application Nos. 10-2012-0093320, 10-2012-122947, 10-2013-0011711, 10-2013-0027308, 10-2013-35546, 10-2013-0078347, 10-2013-0111473, 10-2014-0021884, 2014-0175937, 2015-28082, and the like), and observed that when an alkoxysilyl group is incorporated into an epoxy compound, the thermal expansion property of an epoxy composite is greatly improved. In addition, the applicant of the present invention has also developed and filed a method for preparing an epoxy compound having an alkoxysilyl group exhibiting excellent curing characteristics during curing by minimizing the increase of an epoxy equivalent weight (EEW) of an epoxy resin having an alkoxysilyl group when a composite is prepared using an epoxy having an alkoxysilyl group (Korean Patent Application No. 2017-0147526). It was observed that the alkoxysilyl group of the epoxy compound having an alkoxysilyl group showed improved thermal expansion properties due to the improvement of curing characteristics in the above patent applications.

Furthermore, as a result of continuing research to improve the thermal expansion properties further via the improvement of the alkoxysilyl reactivity in an epoxy material having an alkoxysilyl group, the present inventors have found the following.

That is, it was found that the thermal expansion property of the composite of the epoxy resin having an alkoxysilyl group was greatly improved by blending a specific additive in the composition of the epoxy resin having an alkoxysilyl group. Specifically, when a composite of an epoxy resin having an alkoxysilyl group is prepared, by adding a specific acrylic-based polymer resin, a new effect of greatly improving the thermal expansion properties of the epoxy composite including an epoxy resin having an alkoxysilyl group was discovered, and thus, the present disclosure has been completed.

STATEMENT REGARDING PRIOR DISCLOSURES BY THE INVENTOR OR A JOINT INVENTOR

At least one inventor or joint inventor of the present disclosure has made related disclosures in Chun. H. et. al (2019). Curing mechanism of alkoxysilyl-functionalized epoxy (II): Effect of catalyst on the epoxy chemistry. *Polymer,* 172, 272-282.

SUMMARY

The present disclosure is based on an action of a specific acrylic-based polymer resin which contributes to improvement of the alkoxysilyl reactivity in an epoxy composite of an epoxy resin having an alkoxysilyl group. That is, it was observed that when a specific acrylic-based polymer resin was added, interfacial reactivity between an alkoxysilyl group and an inorganic filer surface was improved, thereby improving a thermal expansion property of an epoxy composite having an alkoxysilyl group.

Thus, an aspect of the present disclosure may provide an epoxy composition exhibiting improved low-CTE properties, a composite thereof, and an article including the same, by mixing 'an enhancer for improving thermal expansion property' via helping the reaction of the alkoxysilyl group when a composite of an epoxy resin having an alkoxysilyl group is prepared.

According to an aspect of the present disclosure, an epoxy composition may include: (1) a main epoxy resin which is (i) an epoxy resin having both one or more alkoxysilyl functional groups and two or more epoxide groups in one molecule or (ii) a mixture of an epoxy resin having both one or more alkoxysilyl functional groups and two or more epoxide groups in one molecule and an epoxy resin having two or more epoxide groups in one molecule; (2) an acrylic-based polymer resin as an enhancer for improving the thermal expansion property; (3) an inorganic filler; (4) a curing agent; and optionally, (5) a curing catalyst, wherein a content of the (2) acrylic-based polymer resin is 0.5 wt % to 10 wt %; and a content of the (3) inorganic filler is 30 wt % to 90 wt %, based on a total weight of a solids content of the epoxy composition.

In an exemplary embodiment in the present disclosure, the acrylic-based polymer resin may be a polymer resin of at least one kind of monomer selected from the group consisting of ethyl acrylate, butyl acrylate, and acrylonitrile.

In another exemplary embodiment in the present disclosure, the main epoxy resin may have a mole ratio of [epoxide group]:[alkoxysilyl group] of 1:0.05 to 0.5.

In addition, in another exemplary embodiment in the present disclosure, the acrylic-based polymer resin may have a glass transition temperature of −40 to 40° C.

Furthermore, in another exemplary embodiment in the present disclosure, the acrylic-based polymer resin may have a weight average molecular weight of 150,000 to 1,000,000.

According to another aspect of the present disclosure, a composite of the epoxy composition may be provided. According to still another aspect of the present disclosure, an article including the epoxy composition may be provided. The article may be at least one kind selected from the group consisting of semiconductor materials, semiconductor components, semiconductor devices, electrical and electronic materials, electrical and electronic components, and electrical and electronic devices.

BRIEF DESCRIPTION OF DRAWINGS

The above and other aspects, features and other advantages of the present disclosure will be more clearly understood from the following detailed description taken in conjunction with the accompanying drawings, in which:

FIG. 1 is a graph showing a dimensional change with temperature of Example 1 and Comparative Example 1.

DETAILED DESCRIPTION

Hereinafter, exemplary embodiments in the present disclosure will now be described in detail with reference to the accompanying drawings.

The present inventors found that a specific acrylic-based polymer resin improves reactivity of an epoxy resin having an alkoxysilyl group with an inorganic filler surface, and completed the present disclosure based thereon. That is, by using an acrylic-based polymer resin as an agent for improving the thermal expansion property of an epoxy resin having an alkoxysilyl group (hereinafter, referred to as a 'an enhancer for improving the thermal expansion property'), when a composite of an epoxy resin having an alkoxysilyl group is prepared, it was found that the interfacial reactivity between the alkoxysilyl group and the inorganic filler was improved, so that the thermal expansion properties of the cured epoxy composite were further improved. Accordingly, a composition of an epoxy resin having an alkoxysilyl group comprising a specific acrylic-based polymer resin as the enhancer for improving the thermal expansion property is provided.

According to an exemplary embodiment of the present disclosure, an epoxy composition comprising: (1) a main epoxy resin which is (i) an epoxy resin having both one or more alkoxysilyl functional groups and two or more epoxide groups in one molecule or (ii) a mixture of an epoxy resin having both one or more alkoxysilyl functional groups and two or more epoxide groups in one molecule and an epoxy resin having two or more epoxide groups in one molecule;

(2) an acrylic-based polymer resin as an enhancer for improving the thermal expansion property; (3) an inorganic filler; (4) a curing agent; and optionally, (5) a curing catalyst, is provided, wherein a content of the (2) acrylic-based polymer resin is 0.5 wt % to 10 wt %; and a content of the (3) inorganic filler is 30 wt % to 90 wt %, based on a total weight of a solids content of the epoxy composition.

As described above, the main epoxy resin may be (1) (i) an epoxy resin having both one or more alkoxysilyl functional groups and two or more epoxide groups in one molecule or (ii) a mixture of an epoxy resin having both one or more alkoxysilyl functional groups and two or more epoxide groups in one molecule and an epoxy resin having two or more epoxide groups in one molecule.

The "epoxy resin having both one or more alkoxysilyl functional groups and two or more epoxide groups in one molecule" described above also refers to the epoxy resin having an alkoxysilyl functional group described above, and hereinafter, may be also referred to as a "silylated epoxy resin." The "epoxy resin having two or more epoxide groups in one molecule" is, hereinafter, also referred to as an "non-silylated epoxy resin." In addition, in the present specification, the "epoxy compound" is used in the same meaning as the "epoxy resin", and the "epoxy resin" is used in the meaning of a resin having two or more epoxy groups in a molecule, as well known in the art.

The silylated epoxy resin may be a commonly known any silylated epoxy resin. For example, the silylated epoxy resin may be alkoxysilylated epoxy compounds (epoxy resins) disclosed in Korean Patent Application Nos. 10-2012-0093320, 10-2012-122947, 10-2013-0011711, 10-2013-0027308, 10-2013-35546, 10-2013-0078347, 10-2013-0111473, 10-2014-0021884, 2014-0175937, 2015-28082, 2017-0147526, and the like.

Specifically, for example, the silylated epoxy resin may be an epoxy compound having an alkoxysilyl group selected from the group consisting of the following Compounds (AI) to (KI) of Korean Patent Application No. 2012-93320:

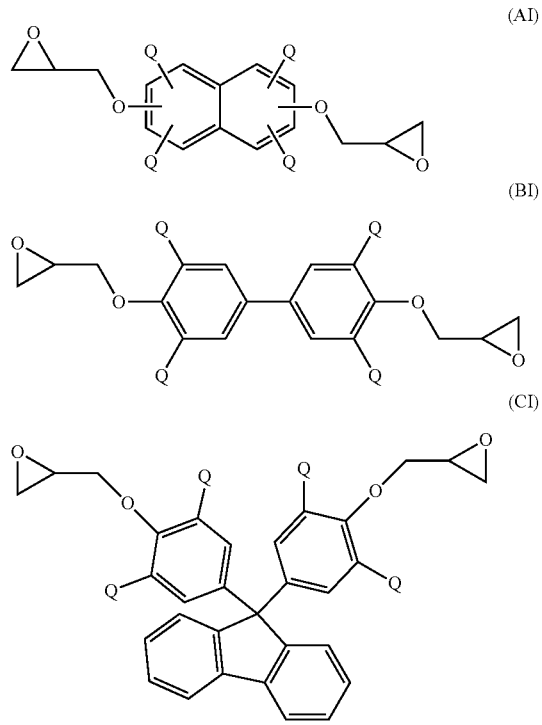

-continued (DI)
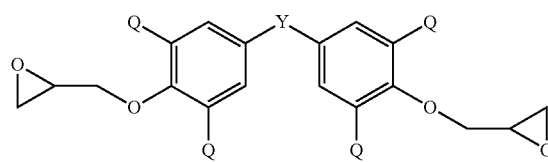

(EI)
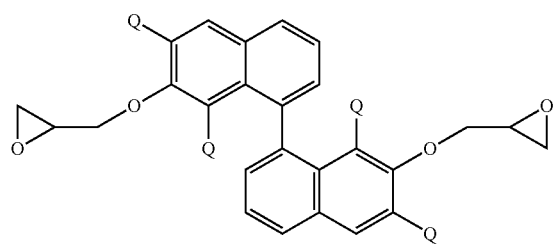

(FI)
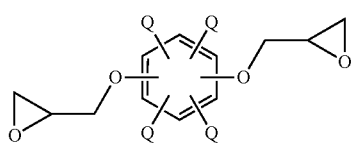

(GI)
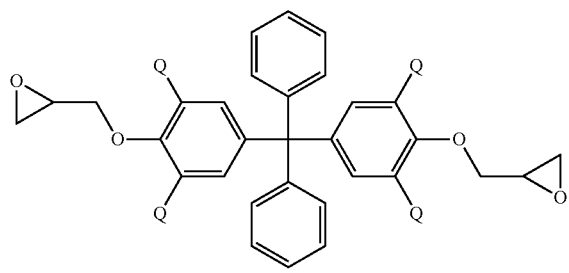

(HI)
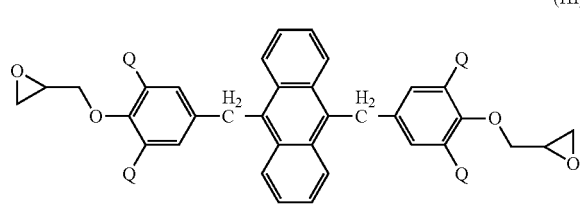

(II)
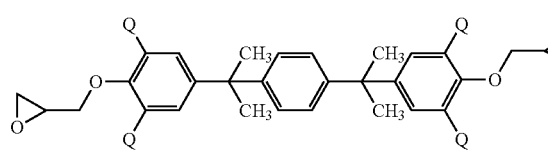

(JI)
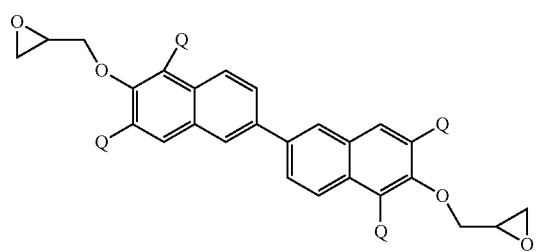

and

-continued (KI)
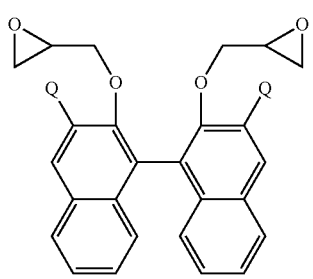

in Chemical formulae (AI) to (KI), at least one of a plurality of Q is the following Chemical Formula S1 and the remainder are independently selected from the group consisting of the following Chemical Formula S3, hydrogen, and $CR_bR_c$—$CR_a$=$CH_2$ (wherein $R_a$, $R_b$ and $R_c$ are each independently H or an alkyl group having 1 to 6 carbon atoms, and the alkyl group may be linear or branched), and in Chemical Formula (DI), Y is —$CH_2$—, —$C(CH_3)_2$—, —$C(CF_3)_2$—, —S—, or —$SO_2$—:

$$-CR_bR_c-CHR_a-CH_2-SiR_1R_2R_3 \quad \text{[Chemical Formula S1]}$$

wherein $R_a$, $R_b$, and $R_c$ are each independently H or an alkyl group having 1 to 6 carbon atoms, at least one of $R_1$ to $R_3$ is an alkoxy group having 1 to 6 carbon atoms and the remainder is an alkyl group having 1 to 10 carbon atoms, and the alkyl group and the alkoxy group may be linear or branched; with a proviso that when Chemical Formula (FI) has one Chemical Formula (SI), the case in which Ra, Rb and RC are all hydrogen, and $R_1$ to $R_3$ are all an alkoxy group having 1 to 6 in the Formula (S1) is excluded;

[Chemical Formula S3]
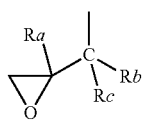

wherein $R_a$, $R_b$, and $R_c$ are each independently H or an alkyl group having 1 to 6 carbon atoms, and the alkyl group may be linear or branched.

In addition, for example, the silylated epoxy resin may be an isocyanurate epoxy compound having an alkoxysilyl group of the following Chemical Formula 1 described in Korean Patent Application No. 2012-122947:

[Chemical Formula 1]
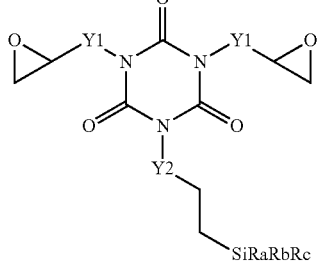

wherein Y1 and Y2 are each independently selected from the group consisting of C1-C10 alkanediyl, C6-C10 aryldiyl, and C7-C10 arylated alkanediyl and may be the same as or different from each other, the alkanediyl group may be linear or branched and may be cyclic or acyclic, and the alkanediyl, aryldiyl, and arylated alkanediyl groups may or may not contain a N, O, S, or P hetero atom, at least one of $R_a$ to $R_c$ is a C1-C10 alkoxy group and the remainder is C1-C10 alkyl, C6-C10 aryl, or C7-C10 aralkyl group, the alkyl group and the alkoxy group may be linear or branched and may be cyclic or acyclic, and the alkyl, alkoxy, aryl, and aralkyl group may or may not contain a N, O, S, or P hetero atom.

In addition, for example, the silylated epoxy resin may be epoxy compounds having an alkoxysilyl group of the following Chemical Formulae (AI) to (KI) described in Korean Patent Application No. 2013-11711:

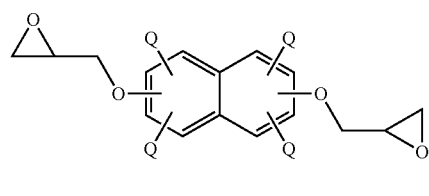

(AI)

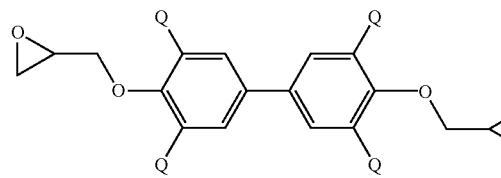

(BI)

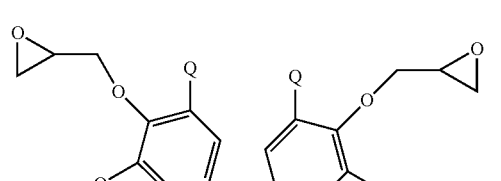

(CI)

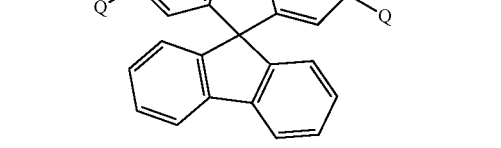

(DI)

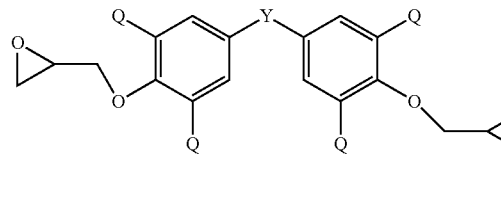

(EI)

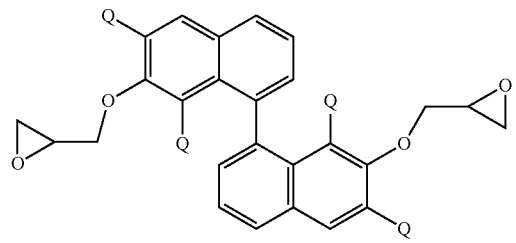

(FI)

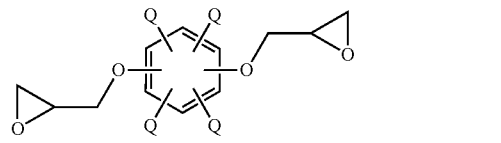

(GI)

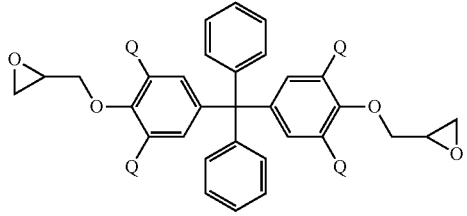

(HI)

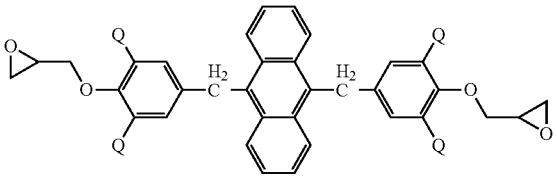

(II)

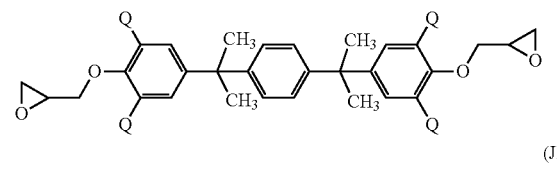

(JI)

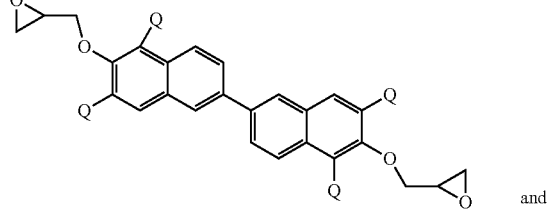

and (KI)

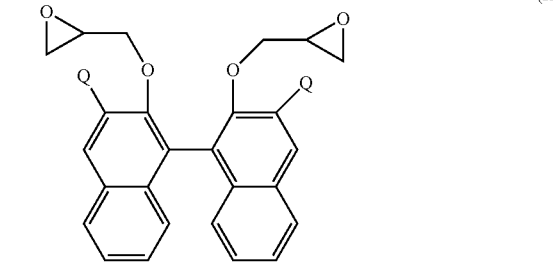

in Chemical Formulae (AI) to (KI), at least one of a plurality of Q is the following Chemical Formula S1 and the remainder are independently selected from the group consisting of the following Chemical Formula S3, hydrogen, and $CR_bR_c$—$CR_a$═$CH_2$ (wherein $R_a$, $R_b$ and $R_c$ are each independently H or an alkyl group having 1 to 6 carbon atoms, and the alkyl group may be linear or branched), and in Chemical Formula (DI), Y is —$CH_2$—, —$C(CH_3)_2$—, —$C(CF_3)_2$—, —S—, or —$SO_2$—:

—$CR_bR_c$—$CHR_a$—$CH_2$—$SiR_1R_2R_3$ [Chemical Formula S1]

wherein $R_a$, $R_b$, and $R_c$ are each independently H or an alkyl group having 1 to 6 carbon atoms, at least one of $R_1$ to $R_3$ is an alkoxy group having 1 to 6 carbon atoms and the remainder is an alkyl group having 1 to 10 carbon atoms, and the alkyl group and the alkoxy group may be linear or branched; with a proviso that when Chemical Formula (FI) has one Chemical Formula (S1), the case in which $R_a$, $R_b$, and $R_c$ are all hydrogen, and $R_1$ to $R_3$ are all an alkoxy group having 1 to 6 in Chemical Formula S1 is excluded;

[Chemical Formula S3]

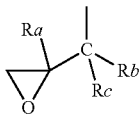

wherein $R_a$, $R_b$, and $R_c$ are each independently H or an alkyl group having 1 to 6 carbon atoms, and the alkyl group may be linear or branched.

In addition, for example, the silylated epoxy resin may be alkoxysilylated epoxy compounds of the following Chemical Formulae AI to HI described in Korean Patent Application No. 2013-27308:

AI

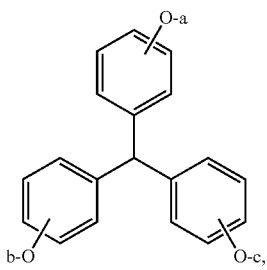

BI

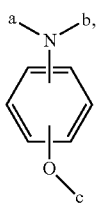

CI

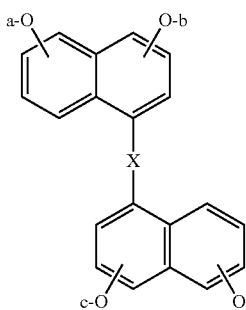

DI

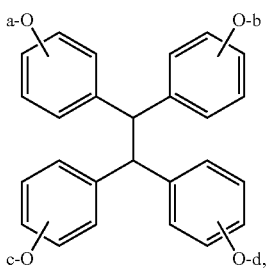

EI

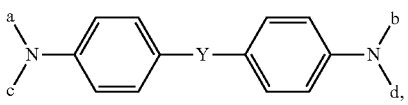

FI

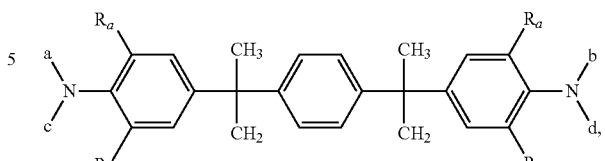

GI

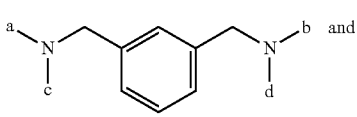

HI

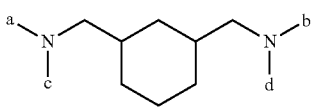

wherein one or two of substituents a to c in Chemical Formula AI or BI is the following Chemical Formula S1, one or two thereof is the following Chemical Formula S2 or S3, and the remainder is hydrogen or $(CH_2)_{z-2}CH=CH_2$ (wherein z is an integer of 3 to 10), one to three of substituents a to d of Chemical Formulae CI to HI is the following Chemical Formula S1, one to three thereof is the following Chemical Formula S2 or S3, and the remainder is hydrogen or —$(CH_2)_{z-2}CH=CH_2$ (wherein z is an integer of 3 to 10), Chemical Formula BI may be substituted by a linear or branched C1-C10 alkyl group at a meta position of oxygen, in Chemical Formula CI, X is a direct linkage, —$CH_2$—, or $$\begin{array}{c} CH_3 \\ | \\ CH_2 \\ \end{array}$$

(structure with phenyl, O—Rb)

(wherein Rb is H or a C1-C3 alkyl group),
in Chemical Formula EI, Y is —$CH_2$—, —$C(CH_3)_2$—, —$C(CF_3)_2$—, —S—, or —$SO_2$—, and
in Chemical Formula FI, $R_a$ is H or a C1-C3 alkyl group:

[Chemical Formula S1]

(epoxide structure)

[Chemical Formula S2]

—$(CH_2)_z$—$SiR_1R_2R_3$

[Chemical Formula S3]

—$CONH(CH_2)_z$—$SiR_1R_2R_3$

—$CONH(CH_2)_z$—$SiR_1R_2R_3$ wherein in Chemical Formulae S2 and S3, at least one of $R_1$ to $R_3$ is an alkoxy group having 1 to 10 carbon atoms and the remainder is an alkyl group having 1 to 10 carbon atoms, the alkyl group and the alkoxy group are linear or branched, and z is an integer of 3 to 10.

In addition, for example, the silylated epoxy resin may be an epoxy compound having an alkoxysilyl group of the following Chemical Formula 1 of Korean Patent Application No. 2013-35546:

[Chemical Formula 1]

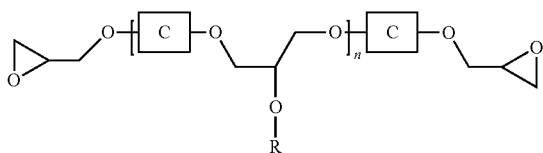

wherein core unit C is independently of each other selected from the structures of the following Chemical Formulae 2-1 to 2-5, and each core unit C in a plurality of core units C present in Chemical Formula 1 may be the same as or different from each other;

[Chemical Fromula 2-1]

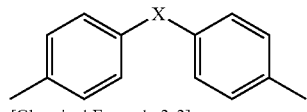

[Chemical Formula 2-2]

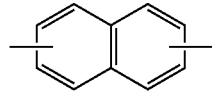

[Chemical Formula 2-3]

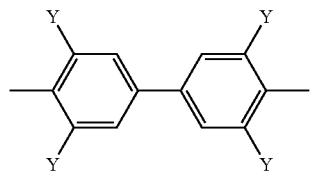

[Chemical Formula 2-4]

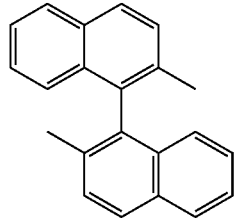

[Chemical Formula 2-5]

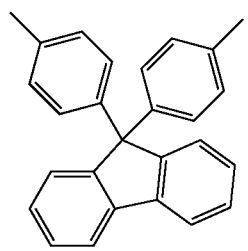

wherein in Chemical Formula 2-1, X is —$CH_2$—, —$C(CH_3)_2$—, —$C(CF_3)_2$—, —S—, or —$SO_2$—, in Chemical Formula 2-3, Y is each independently selected from the group consisting of H and a C1 to C5 alkyl group;

n is an integer of 1 to 10, when n is 1, R is a structure of the following Chemical formula 3a or 3b, when n is 2 or more, at least one of a plurality of R has a structure of the following Chemical Formula 3a or 3b and the remainder is hydrogen, and among the epoxy compounds of Chemical Formula 1, an epoxy compound of Chemical Formula 2-1 in which all X is —$C(CH_3)_2$— in core units and R is the following Chemical Formula 3b, is excluded:

—$(CH_2)_m$—$SiR_aR_bR_c$      [Chemical Formula 3a]

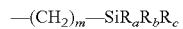

—$CONH(CH_2)_m$—$SiR_aR_bR_c$      [Chemical Formula 3b]

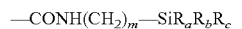

wherein at least one of $R_a$ to $R_e$ is an alkoxy group having 1 to 5 carbon atoms and the remainder is an alkyl group having 1 to 10 carbon atoms, the alkoxy group and the alkyl group may be linear or branched, and m is an integer of 3 to 10.

In addition, for example, the silylated epoxy resin may be novolac-based epoxy compounds having an alkoxysilyl group of the following Chemical Formulae I-1 to I-4 of Korean Patent Application No. 2013-78347:

[Chemical Formula I-1]

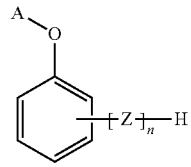

wherein Z is one of the group consisting of the following Chemical Formulae 1A to 1F:

1A

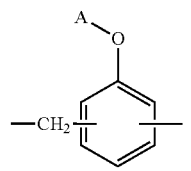

1B

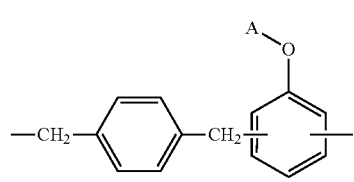

1C

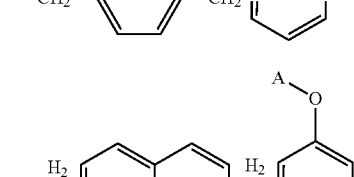

1D

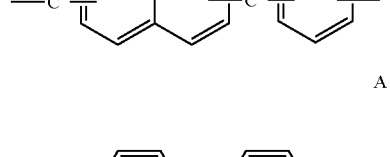

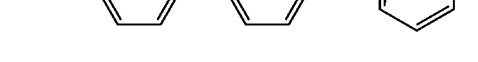

-continued

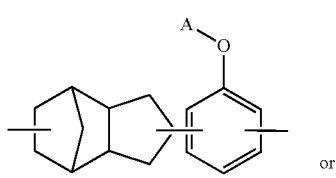

or

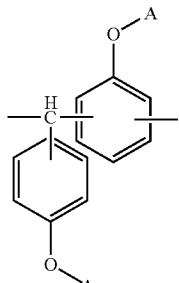

;

[Chemical Formula I-2]

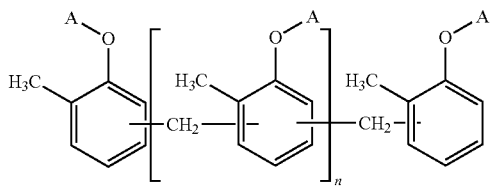

[Chemical Formula I-3]

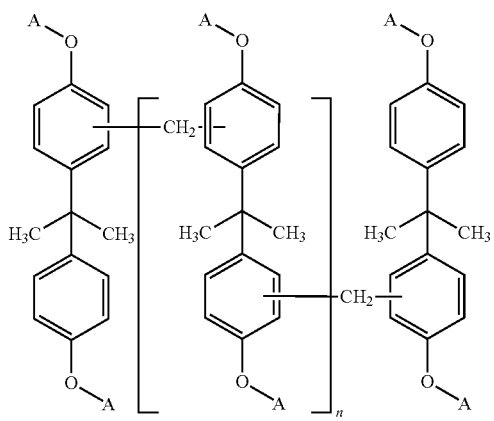

[Chemical Formula I-4]

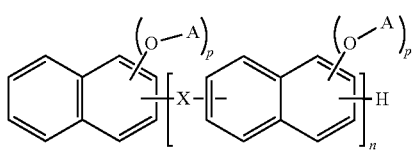

wherein x is

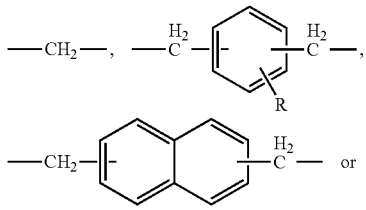

-continued

1E

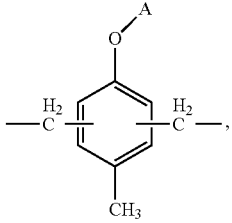

1F and in

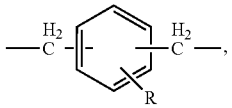

R is a C1-C10 linear or branched alkyl group;
wherein in Chemical Formulae I-1 to I-4,
at least two of a plurality of A has a structure of the following Chemical Formula A2, at least one thereof has a structure of the following Chemical formula A3 or A4, and when at least one thereof is Chemical Formula A3, the remainder of A is the following Chemical Formula B3 or hydrogen and when at least one thereof is A4, the remainder of A is hydrogen, in Chemical Formula I-1, when Z is 1A to 1E, n is an integer of 2 or more and when Z is 1F, n is an integer of 1 or more, in Chemical Formulae I-2 and I-3, n is an integer of 1 or more, in Chemical Formula I-4, when x is

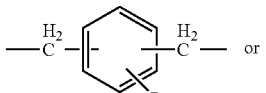 or

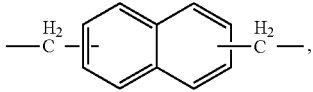

n is an integer of 2 or more and when x is

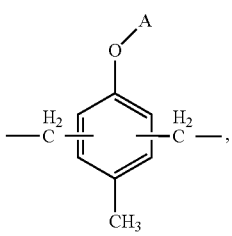

n is an integer of 1 or more, and in Chemical Formula I-4, p is 1 or 2:

[Chemical Formula A2]

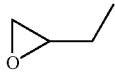

[Chemical Formula A3]

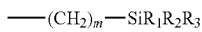

[Chemical Formula A4]

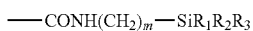

wherein in Chemical Formulae A3 and A4, at least one of $R_1$ to $R_3$ is an alkoxy group having 1 to 5 carbon atoms and the remainder is an alkyl group having 1 to 10 carbon atoms, the alkoxy group and alkyl group are linear or branched, and m is an integer of 3 to 10;

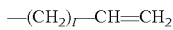 [Chemical Formula B3]

wherein l is an inter of 1 to 8.

In addition, for example, the silylated epoxy resin may be epoxy compounds having an alkoxysilyl group, which have at least one alkoxysilyl group, (1) independently selected from the group consisting of the following Chemical Formulae S11 to S16, (2) independently selected from the group consisting of the following Chemical Formulae S21 to S26, (3) independently selected from the group consisting of the following Chemical Formulae S11 to S16 and the following Chemical Formulae S31 to S38, or (4) independently selected from the group consisting of the following Chemical Formulae S21 to S26 and the following Chemical Formulae S31 to S38; and at least two epoxy groups independently selected from the group consisting of the following Chemical Formulae S51 to S58, in a kind of core selected from the group consisting of the following Chemical Formulae (A') to (N'), as disclosed in Korean Patent Application No. 2013-111473:

(A')

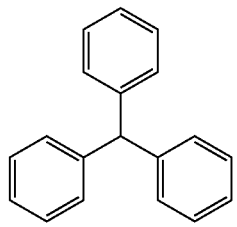

(B')

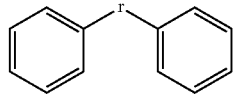

(C')

(D')

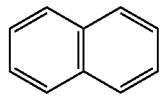

(E')

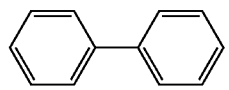

(F')

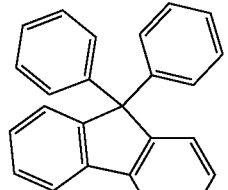

(G')

(H')

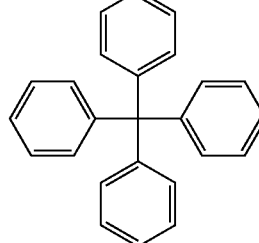

(I')

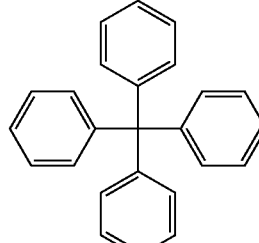

(J')

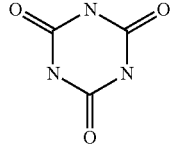

(K')

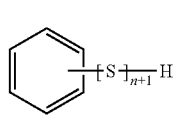

(L')

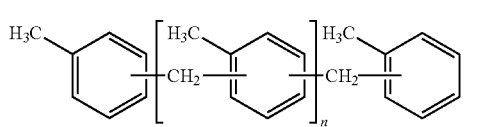

-continued

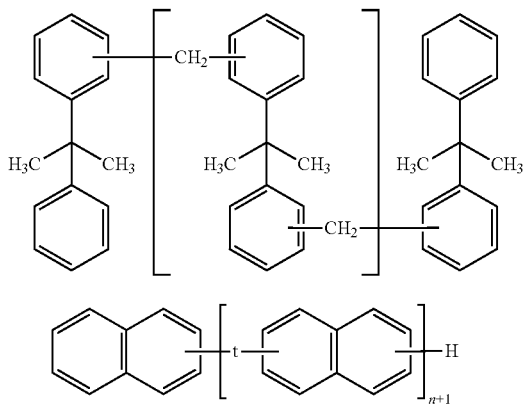
(M')

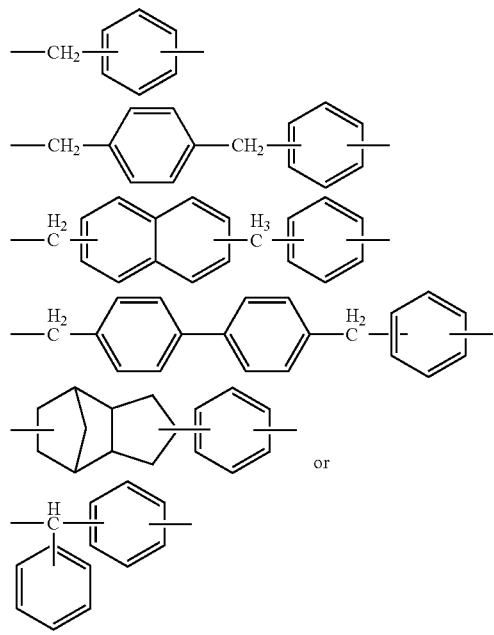
(N')

wherein in Chemical Formula (A'), -q- is —CH$_2$— or a direct linkage, in Chemical Formula (D'), -r- is —C(CH$_3$)$_2$—, —CH$_2$—, —C(CF$_3$)$_2$—, —SO$_2$—, or —S—, in Chemical Formula (K'), s is,

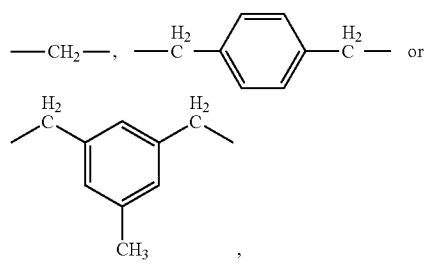

in Chemical Formula (N'), t is

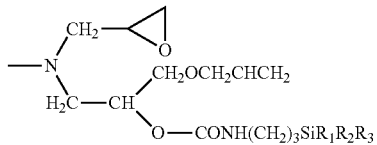

and in Chemical Formula (K') to (N'), n is an integer of 1 or more;

[Chemical Formula S1]

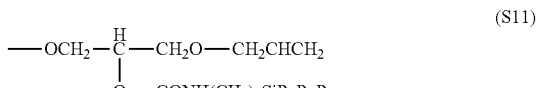 (S11)

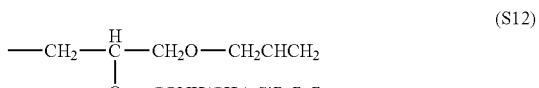 (S12)

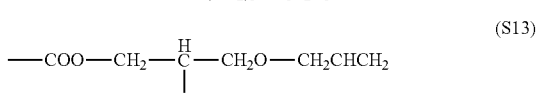 (S13)

 (S14)

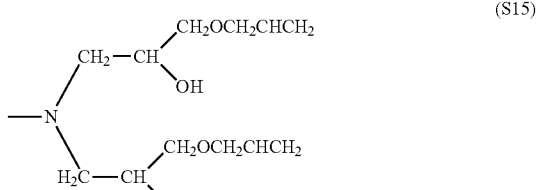 (S15) and (S16)

in Chemical Formulae S11 to S16, at least one of R$_1$ to R$_3$ is an alkoxy group having 1 to 5 carbon atoms and the remainder is an alkyl group having 1 to 10 carbon atoms, and the alkoxy group and the alkyl group may be linear or branched;

[Chemical Formula S2]

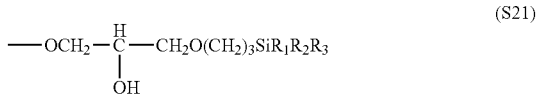 (S21)

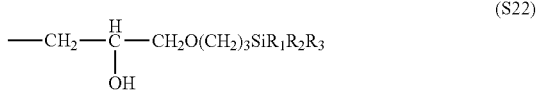 (S22)

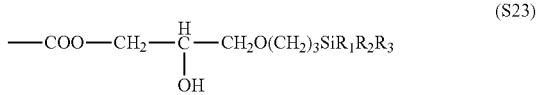 (S23)

-continued

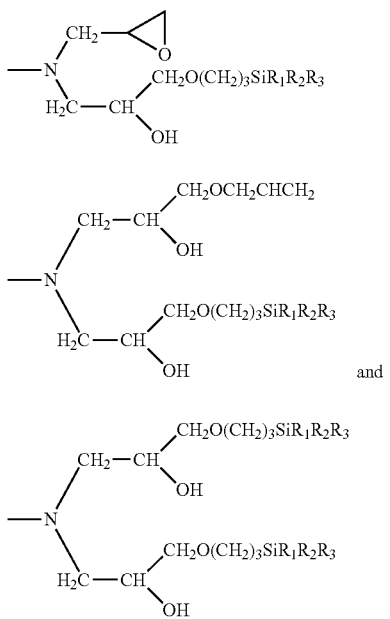

(S24)

(S25)

and (S26)

in Chemical Formulae S21 to S26, at least one of $R_1$ to $R_3$ is an alkoxy group having 1 to 5 carbon atoms and the remainder is an alkyl group having 1 to 10 carbon atoms, and the alkoxy group and alkyl group may be linear or branched;

[Chemical Formula S3]

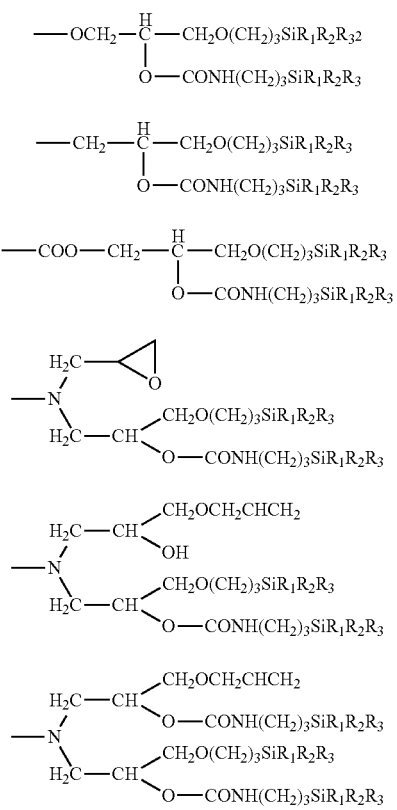

(S31)

(S32)

(S33)

(S34)

(S35)

(S36)

-continued

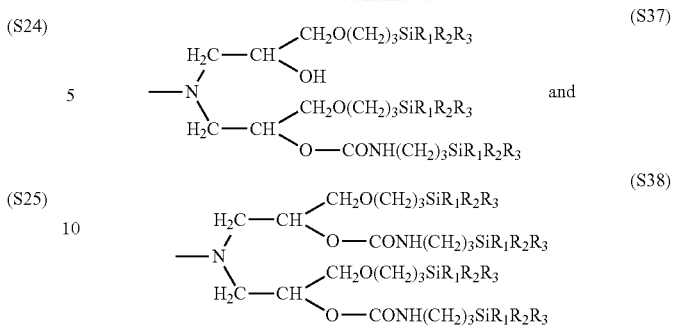

(S37)

and (S38)

in Chemical Formulae S31 to S38, at least one of $R_1$ to $R_3$ is an alkoxy group having 1 to 5 carbon atoms and the remainder is an alkyl group having 1 to 10 carbon atoms, and the alkoxy group and the alkyl group may be linear or branched;

[Chemical Formula S5(3)]

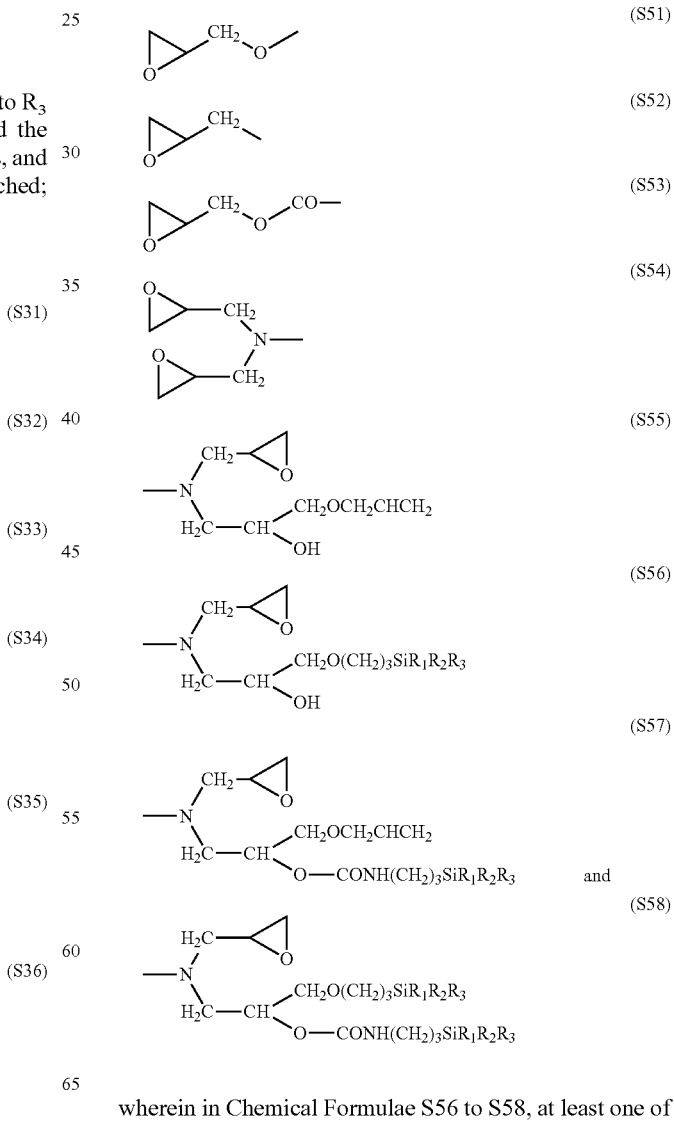

(S51)

(S52)

(S53)

(S54)

(S55)

(S56)

(S57)

and (S58)

wherein in Chemical Formulae S56 to S58, at least one of the $R_1$ to $R_3$ is an alkoxy group having 1 to 5 carbon atoms and the remainder is an alkyl group having 1 to 10 carbon atoms, and the alkoxy group and alkyl group may be linear or branched.

In addition, for example, the silylated epoxy resin may be selected from the group consisting of the following Chemical Formulae (AF) to (NF), described in in Korean Patent Application No. 10-2014-0021884:

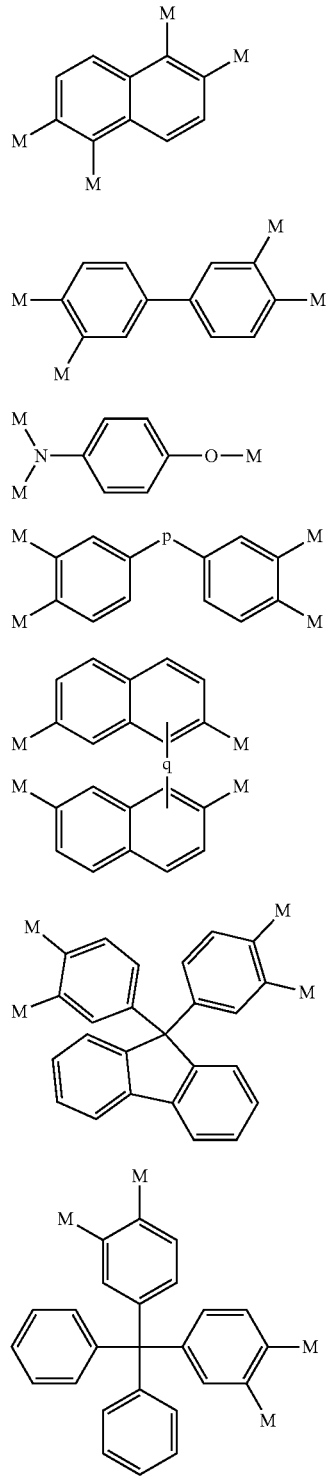

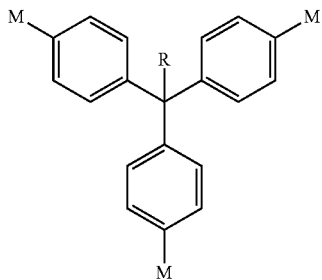

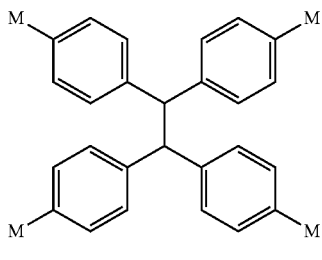

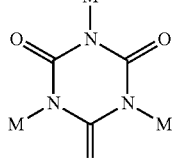

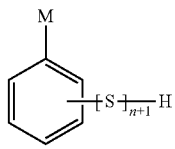

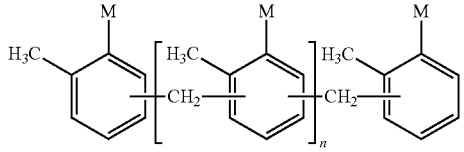

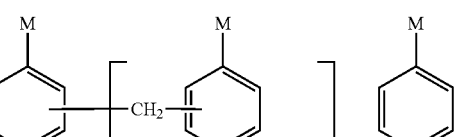

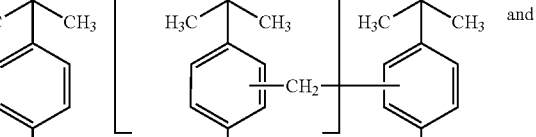

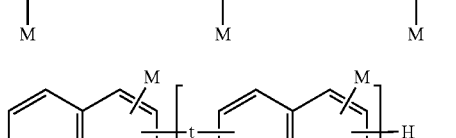

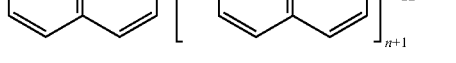

wherein in Chemical Formula (DF), -p- is —C(CH$_3$)$_2$—, —CH$_2$—, —C(CF$_3$)$_2$—, —S—, —SO$_2$—,

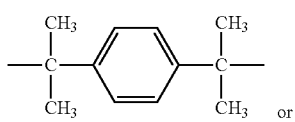

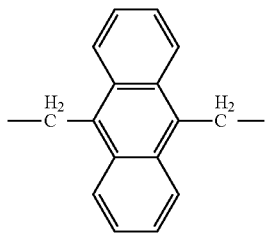

in Chemical Formula (EF), -q- is —CH$_2$— or a direct linkage, in Chemical Formula HF, R is hydrogen, a hydroxy group, an alkyl group (C1-C10), or an aromatic group, in Chemical Formula (KF), S is

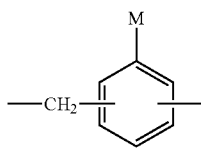

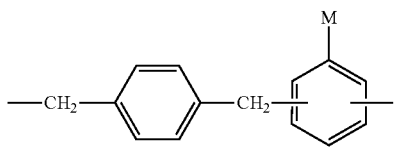

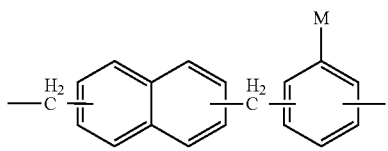

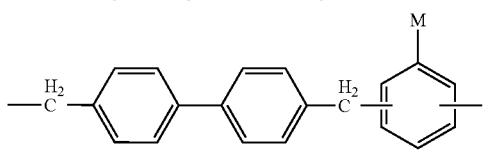

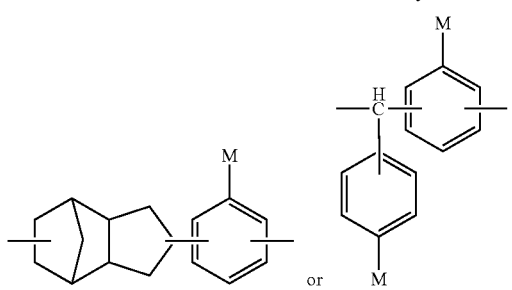

in Chemical Formula (NF), t is —CH$_2$—,

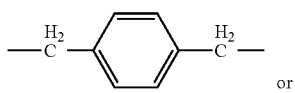

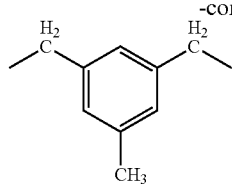

in Chemical Formulae (KF) to (NF), n is an integer of 1 or more, and at least two of a plurality of M in Chemical Formulae (AF), (BF), (DF) to (IF), and (KF) to (NF) are an epoxy group selected from the group consisting of the following Chemical Formulae S41 to S45, at least one thereof is an alkoxysilyl group which is an S1 substituent independently selected from the group consisting of the following Chemical Formulae (S11) to (S15) or an S2 substituent independently selected from the group consisting of the following Chemical Formulae (S21) to (S25), and the remainder thereof is hydrogen or an S3 substituent selected from the group consisting of the following Chemical Formulae (S31) to (S35), and at least two of a plurality of M in Chemical Formulae (CF) and (JF) is an epoxy group of the following Chemical Formula (S42) and the remainder one is an alkoxysilyl group of the following Chemical Formula (S12) or (S22):

[Chemical Formula S1]

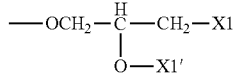 (S11)

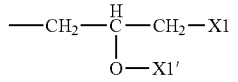 (S12)

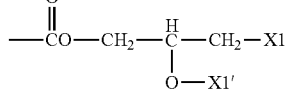 (S13)

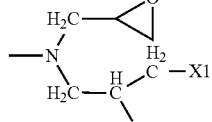 (S14)

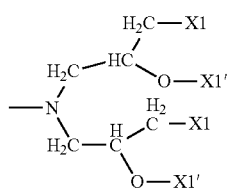 (S15)

in Chemical Formulae S11 to S15, X1 is OR$_4$, OH, NR$_4$R$_5$, SR$_4$, or OCONH(CH$_2$)$_3$SiR$_1$R$_2$R$_3$ and X1' is CONH(CH$_2$)$_3$SiR$_1$R$_2$R$_3$, and at least one of R$_1$ to R$_3$ is an alkoxy group having 1 to 5 carbon atoms and the remainder is an alkyl group having 1 to 10 carbon atoms, with a proviso that R$_4$ or R$_5$ may be an alkyl group, an aryl group, or an aralkyl group having 1 to 20 carbon atoms and may include a hetero compound containing N, O, P, or S;

[Chemical Formula S2]

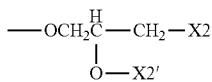 (S21)

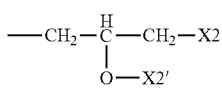 (S22)

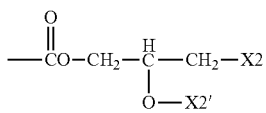 (S23)

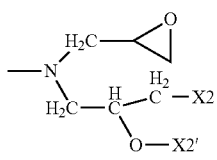 (S24)

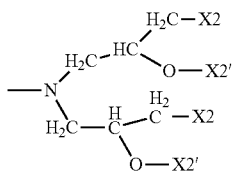 (S25)

in Chemical Formulae S21 to S25, X2 is $OR_4$, OH, $NR_4R_5$, $SR_4$, or $O(CH_2)_nCH_2CH_2SiR_1R_2R_3$ and X2' is $(CH_2)_nCH_2CH_2SiR_1R_2R_3$, and at least one of $R_1$ to $R_3$ is an alkoxy group having 1 to 5 carbon atoms and the remainder is an alkyl group having 1 to 10 carbon atoms, with a proviso that $R_4$ or $R_5$ may be an alkyl group, an aryl group, or an aralkyl group having 1 to 20 carbon atoms and may include a hetero compound containing N, O, P, or S;

[Chemical Formula S4 (3)]

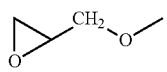 (S41)

 (S42)

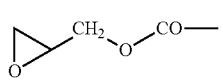 (S43)

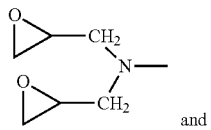 (S44) and

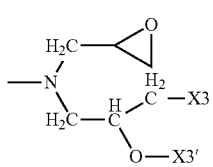 (S45)

wherein X3 is $OR_4$, OH, $NR_4R_5$, $SR_4$, $OCONH(CH_2)_3SiR_1R_2R_3$, or $O(CH_2)_nCH_2CH_2SiR_1R_2R_3$ and X3' is H, $CONH(CH_2)_3SiR_1R_2R_3$, or $(CH_2)_nCH_2CH_2SiR_1R_2R_3$, and at least one of $R_1$ to $R_3$ is an alkoxy group having 1 to 5 carbon atoms and the remainder is an alkyl group having 1 to 10 carbon atoms, with a proviso that $R_4$ or $R_5$ may be an alkyl group, an aryl group, or an aralkyl group having 1 to 20 carbon atoms and may include a hetero compound containing N, O, P, or S;

[Chemical Formula S3]

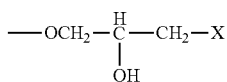 (S31)

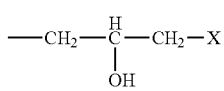 (S32)

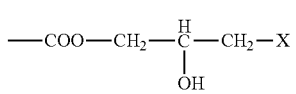 (S33)

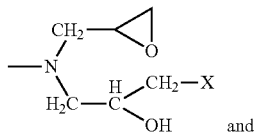 (S34) and

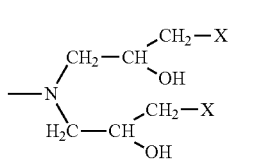 (S35)

in Chemical Formulae S31 to S35, X is $OR_4$, OH, $NR_4R_5$, or $SR_4$, with a proviso that $R_4$ or $R_5$ may be an alkyl group, an aryl group, or an aralkyl group having 1 to 20 carbon atoms and may include a hetero compound containing N, O, P, or S.

For example, the silylated epoxy resin may be epoxy compounds having an alkoxysilyl group of the following Chemical Formulae (AF) to (OF) described in Korean Patent Application No. 2014-175937:

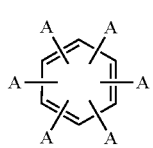 (AF)

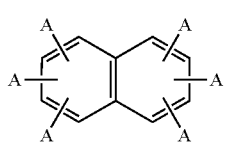 (BF)

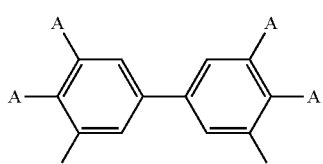 (CF)

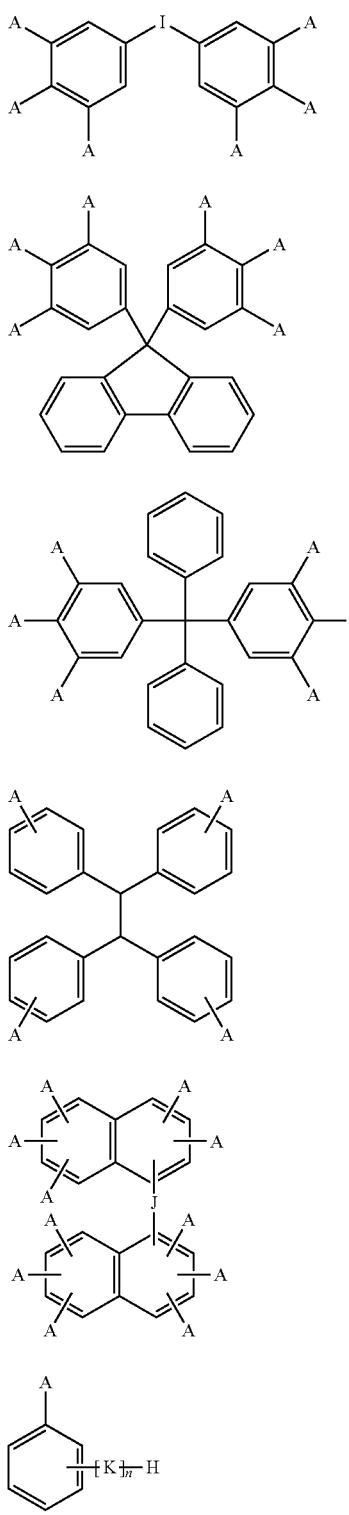
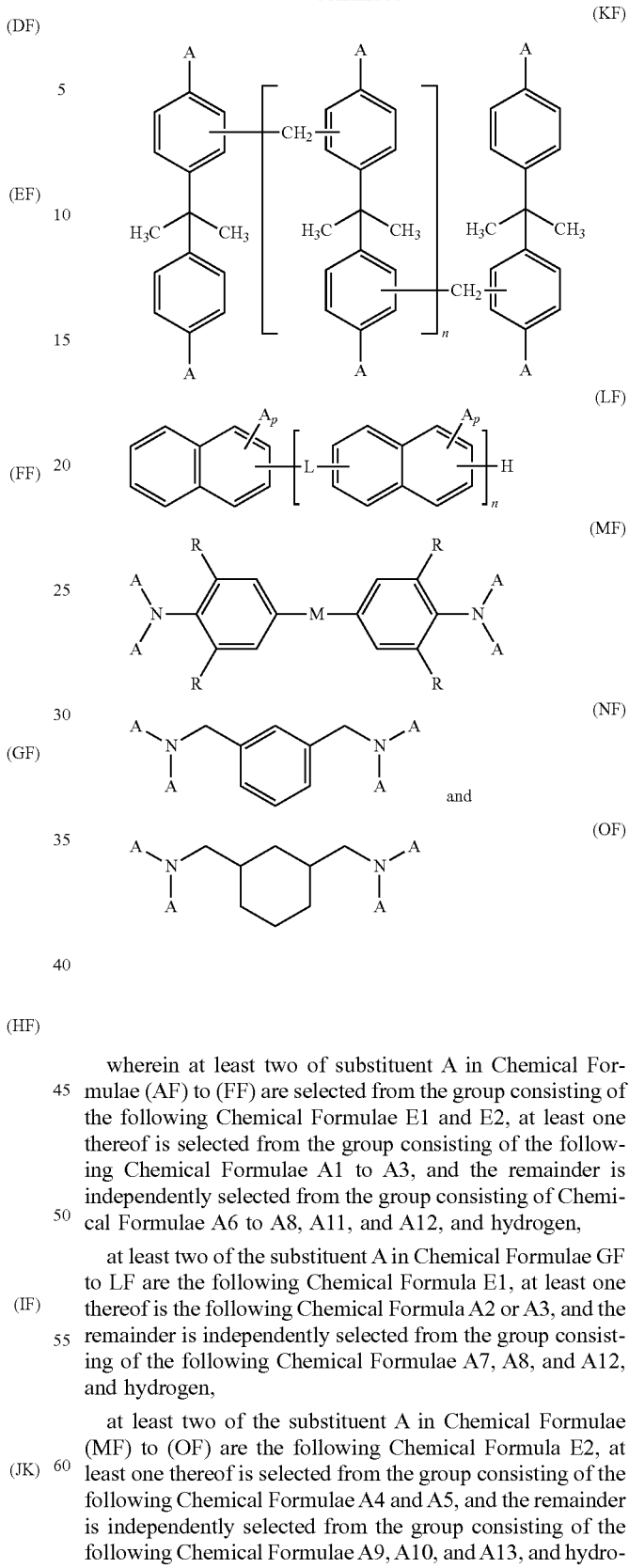

wherein at least two of substituent A in Chemical Formulae (AF) to (FF) are selected from the group consisting of the following Chemical Formulae E1 and E2, at least one thereof is selected from the group consisting of the following Chemical Formulae A1 to A3, and the remainder is independently selected from the group consisting of Chemical Formulae A6 to A8, A11, and A12, and hydrogen, at least two of the substituent A in Chemical Formulae GF to LF are the following Chemical Formula E1, at least one thereof is the following Chemical Formula A2 or A3, and the remainder is independently selected from the group consisting of the following Chemical Formulae A7, A8, and A12, and hydrogen, at least two of the substituent A in Chemical Formulae (MF) to (OF) are the following Chemical Formula E2, at least one thereof is selected from the group consisting of the following Chemical Formulae A4 and A5, and the remainder is independently selected from the group consisting of the following Chemical Formulae A9, A10, and A13, and hydrogen, in Chemical Formula (DF), I is —CH$_2$—, —C(CH$_3$)$_2$—, —C(CF$_3$)$_2$—, —S—, —SO$_2$—,

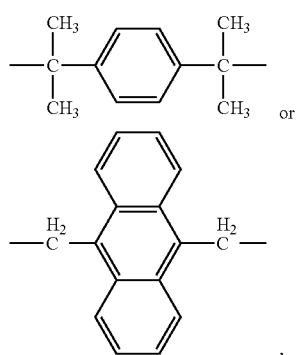
or
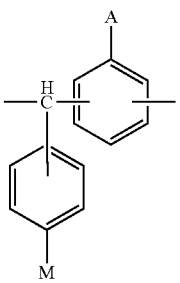
, in Chemical Formula (HF), J is a direct linkage, —CH$_2$—, or

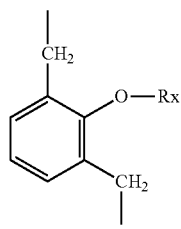

(Rx is H or a C1-C3 alkyl group),
in Chemical Formula (IF), K is one of the group consisting of the following Chemical Formulae 1A to 1F, 1A
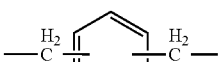

1B
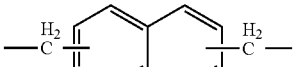

1C
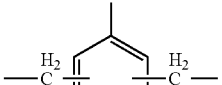

1D
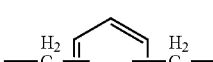

1E
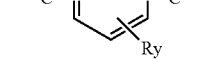
and

1F
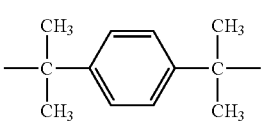

in Chemical Formula (LF), L is —CH$_2$—,

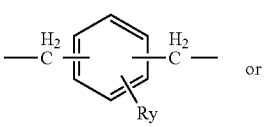
,

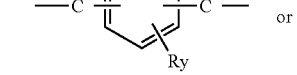
or

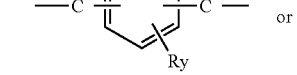
,

Ry is a C$_1$-C$_{10}$ linear or branched alkyl group,
in Chemical Formula (MF), M is —CH$_2$—, —C(CH$_3$)$_2$—, —C(CF$_3$)$_2$—, —S—, —SO$_2$—, or

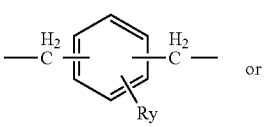

and R is H or C$_1$-C$_3$ alkyl,
in Chemical Formula (IF), when K is 1A to 1E, n is an integer of 3 or more and
when K is 1F, n is an integer of 2 or more,
in Chemical Formula (JF), n is an integer of 2 or more,
in Chemical Formula (KF), n is an integer of 0 or more,
in Chemical Formula (LF), when L is —CH$_2$—,

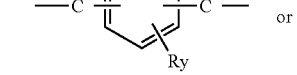 or

-continued

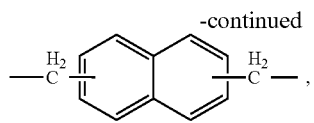

n is an integer of 3 or more and
when L is

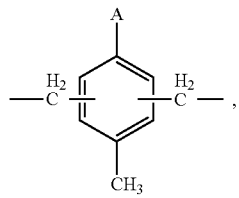

n is an integer of 2 or more, and
in Chemical Formula (LF), p is 1 or 2:

[Chemical Formula E1]
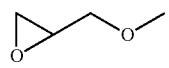

[Chemical Formula E2]
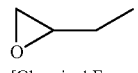

[Chemical Formula A1]
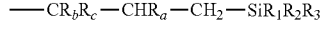

[Chemical Formula A2]
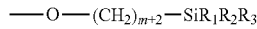

[Chemical Formula A3]
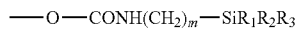

[Chemical Formula A4]
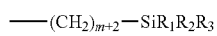

[Chemical Formula A5]
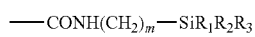

wherein in Chemical Formula A1, $R_a$, $R_b$, and $R_c$ are each independently H or an alkyl group having 1 to 6 carbon atoms, and in Chemical Formula A1 to A5, at least one of $R_1$ to $R_3$ is an alkoxy group having 1 to 6 carbon atoms and the remainder is an alkyl group having 1 to 10 carbon atoms, the alkyl group and the alkoxy group may be linear or branched and may be cyclic or acyclic and may or may not contain a N, O, S, or P heteroatom, and m is an integer of 1 to 10;

     [Chemical Formula A6]

     [Chemical Formula A7]

     [Chemical Formula A8]

     [Chemical Formula A9]

     [Chemical Formula A10]

wherein in Chemical Formula A6, $R_a$, $R_b$, and $R_c$ are each independently H or an alkyl group having 1 to 6 carbon atoms, and in Chemical Formula A6 to A10, $R_4$ to $R_6$ are an aliphatic, cycloaliphatic, or aromatic unreactive group having 1 to 20 carbon atoms, the unreactive group may be linear or branched and may be cyclic or acyclic, and may or may not contain a N, O, S, or P heteroatom, and m is an integer of 1 to 10;

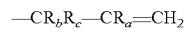     [Chemical Formula A11]

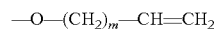     [Chemical Formula A12]

     [Chemical Formula A13]

wherein in Chemical Formula A11, $R_a$, $R_b$, and $R_c$ are each independently H or an alkyl group having 1 to 6 carbon atoms, and the alkyl group may be linear or branched, and may be cyclic or acyclic and may or may not contain a N, O, S, or P hetero atom, and in Chemical Formulae A12 and A13, m is an integer of 1 to 10.

In addition, for example, the silylated epoxy resin may be an epoxy compound having an alkoxysilyl group of the following Chemical Formulae (AF) to (KF) described in Korean Patent Application No. 2015-0028082:

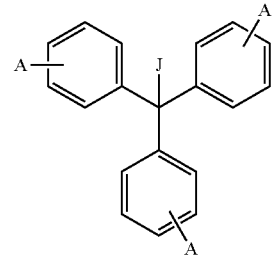 (AF)

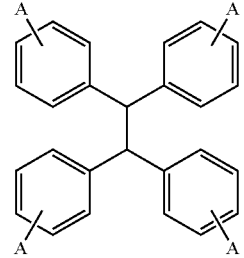 (BF)

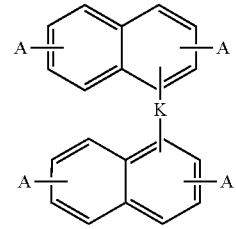 (CF)

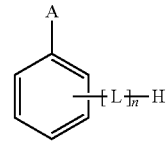 (DF)

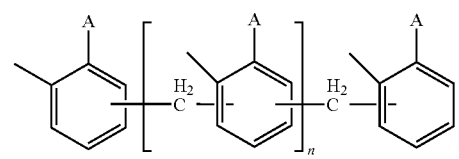 (EF)

(FF)
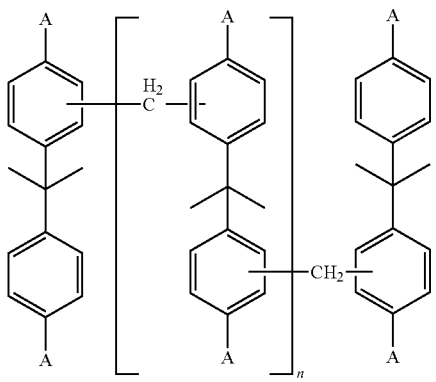

(GF)
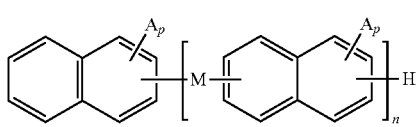

(HF)
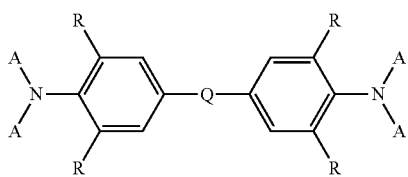

(IF)
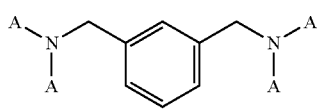

(JF)
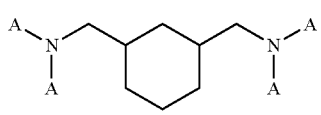

(KF)
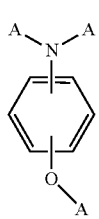

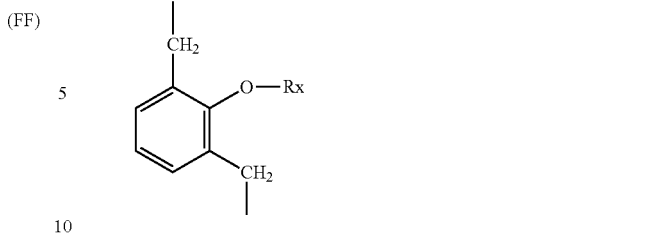

(Rx is H or a C1-C3 alkyl group),
in Chemical Formula (DF), L is (1A)
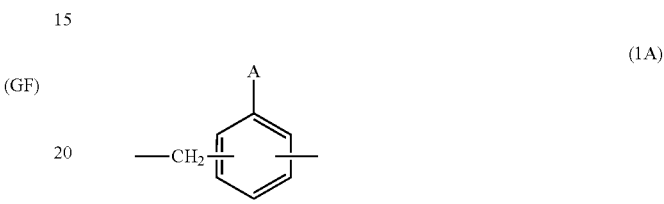

(1B)

(1C)
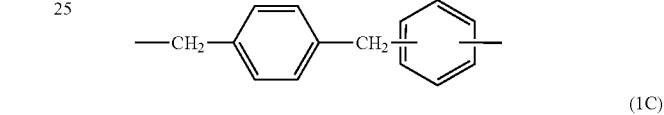

(1D)
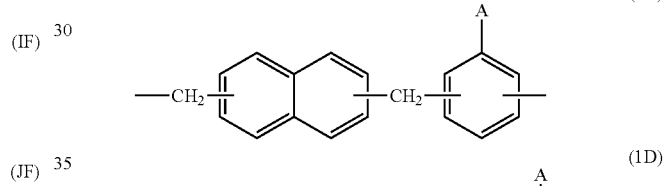

(1E)
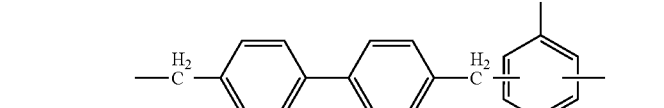

or (1F)
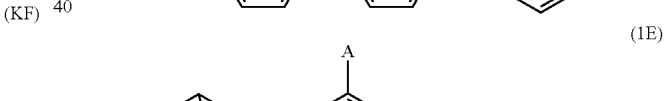

wherein in Chemical Formulae (AF) to (GF), at least two of a plurality of substituent A are the following Chemical Formula E1, at least one A is the following Chemical Formula A1 or A2, and when there is a remaining substituent A, it is each independently selected from the group consisting of —OH, —O—(CH$_2$)$_l$—OH (l is an integer of 1 to 10), and the following Chemical Formulae A5 and A6, in Chemical Formulae (HF) to (KF), at least two of a plurality of substituents A are the following Chemical Formula E2, at least one A is the following Chemical Formula A3 or A4, and when there is a remaining substituent A, it is each independently selected from the group consisting of —H, —(CH$_2$)$_l$—OH (l is an integer of 1 to 10), and the following Chemical Formulae A7 and A8, in Chemical Formula (CF), K is a direct linkage, —CH$_2$—, or in Chemical Formula (GF), M is —CH$_2$—,

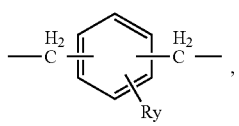

-continued

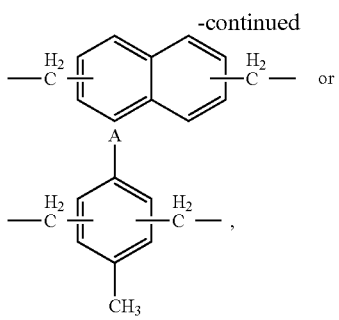

in

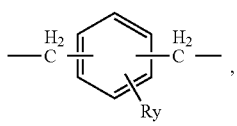

Ry is a $C_1$-$C_{10}$ linear or branched alkyl group,
in Chemical Formula (HF), Q is —$CH_2$—, —$C(CH_3)_2$—, —$C(CF_3)_2$—, —S—, —$SO_2$—, or

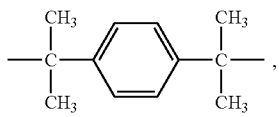

and R is each independently H or C1-C3 alkyl,
in Chemical Formula (DF), when L is 1A to 1E, n is an integer of 2 or more, and
when L is 1F, n is an integer of 1 or more,
in Chemical Formula (EF), n is an integer of 1 or more,
in Chemical Formula (FF), n is 0 or an integer or 1 or more,
in Chemical Formula (GF), when M is —$CH_2$—,

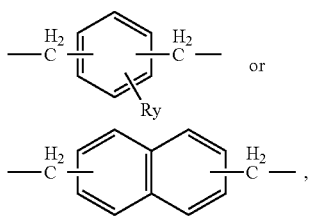

n is an integer of 2 or more, and
when M is

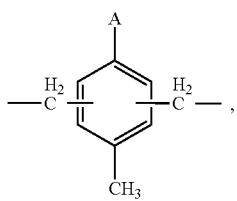

n is an integer of 1 or more, and in Chemical Formula (GF), p is 1 or 2:

[Chemical Formula E1]

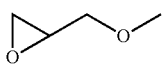

[Chemical Formula E2]

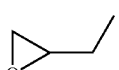

[Chemical Formula A1]

—O—$(CH_2)_l$—O—$(CH_2)_{m+2}$—$SiR_1R_2R_3$

[Chemical Formua A2]

—O—$(CH_2)_l$—O—$CONH(CH_2)_{m+2}$—$SiR_1R_2R_3$

[Chemical Formula A3]

—$(CH_2)_l$—O—$(CH_2)_{m+2}$—$SiR_1R_2R_3$

[Chemical Formula A4]

—$(CH_2)_l$—O—$CONH(CH_2)_{m+2}$—$SiR_1R_2R_3$ wherein in Chemical Formula A1 to A4, at least one of $R_1$ to $R_3$ is an alkoxy group having 1 to 6 carbon atoms and the remainder is an alkyl group having 1 to 10 carbon atoms, and the alkyl group and the alkoxy group may be linear or branched and may be cyclic or acyclic and may or may not contain at least one hetero atom selected from the group consisting of N, O, S, and P,
l is an integer of 1 to 10, and
m is an integer of 1 to 8:

—O—$(CH_2)_l$—O—$(CH_2)_m$—CH=$CH_2$     [Chemical Formula A5]

—O—$(CH_2)_m$—CH=$CH_2$     [Chemical Formula A6]

—$(CH_2)_l$—O—$(CH_2)_m$—CH=$CH_2$     [Chemical Formula A7]

—$(CH_2)_m$—CH=$CH_2$     [Chemical Formula A8]

in Chemical Formulae A5 to A8, l is an integer of 1 to 10, and m is an integer of 1 to 8.

For example, the silylated epoxy resin may be an epoxy resin having an alkoxysilyl group of the following Chemical Formulae (AF) to (1F) of Korean Patent Application No. 2017-0147526:

(AF)

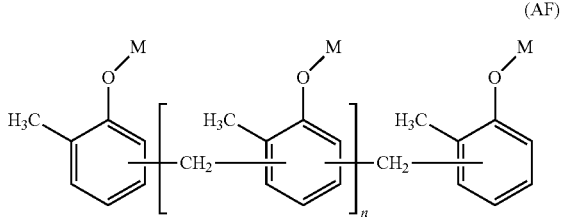

(BF)

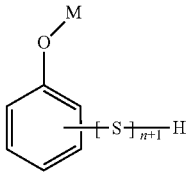

-continued
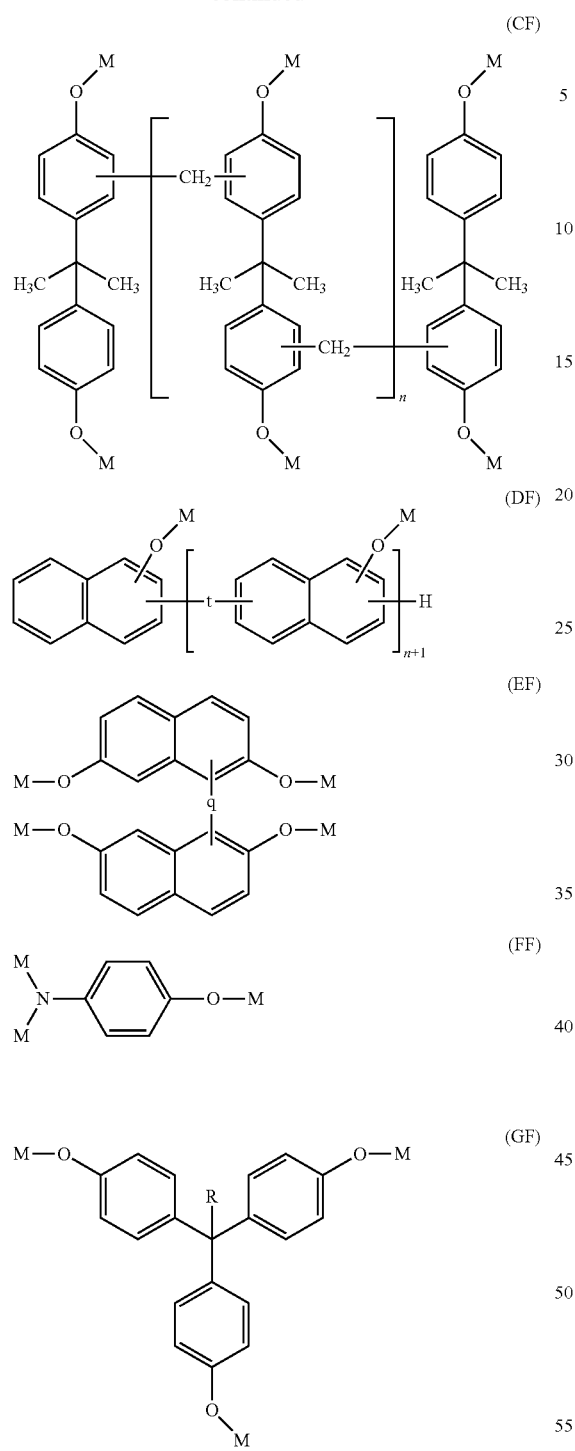
(CF)
(DF)
(EF)
(FF)
(GF)
(HF)
and
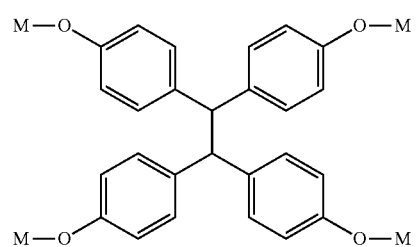
(IF)
wherein in Chemical Formula (BF), S is
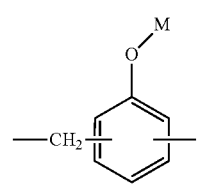
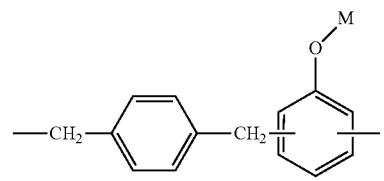
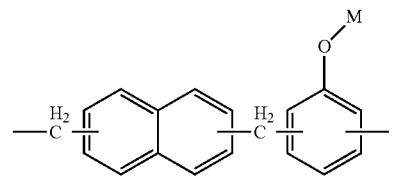
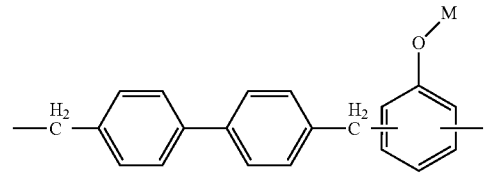
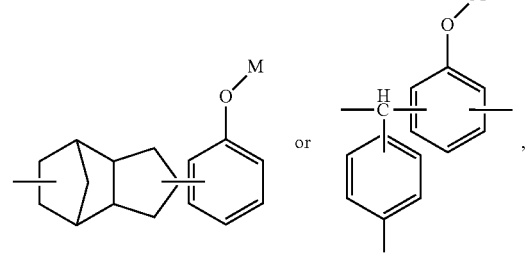
in Chemical Formula (DF), t is —CH$_2$—,
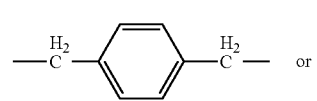 or -continued

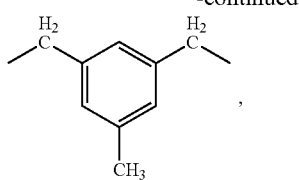

in Chemical Formulae (AF) to (DF), n is an integer of 1 or more, in Chemical Formula (EF), -q- is —$CH_2$— or a direct linkage, in Chemical Formula (GF), R is hydrogen, a hydroxyl group, a C1-C10 alkyl group, or a C6 or C10 aromatic group, and in Chemical Formulae (AF) to (IF), at least one of M is a structure having an alkoxysilyl group selected from the group consisting of —$CH_2$CHOX$CH_2$OX (Chemical Formula (S21)), —$CH_2$CHOX$CH_2$Cl (Chemical Formula (S22)), and —CH($CH_2$OX) ($CH_2$Cl) (Chemical Formula (S23)) and the remainder is a structure having an epoxy group of the following Chemical Formula (E1):

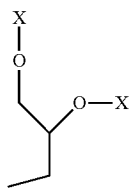 (S21)

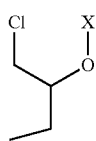 (S22)

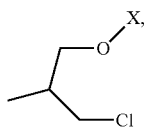 (S23)

in Chemical Formulae (S21) to (S23), X is CONH($CH_2$)$_3$Si$R_1R_2R_3$, and at least one of $R_1$ to $R_3$ is an alkoxy group having 1 to 5 carbon atoms and the remainder is an alkyl group having 1 to 10 carbon atoms:

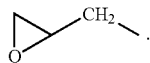 (E1)

The structures of Chemical Formulae (AF) to (IF) may be connected to each other by a linking group having an alkoxysilyl group of the following Chemical Formula (LG2) at any one position of M:

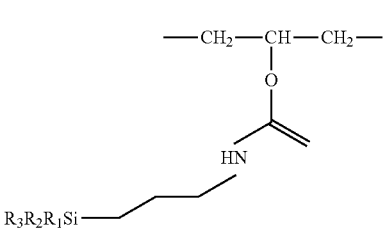 (LG2)

(in Chemical Formula (LG2), at least one of $R_1$ to $R_3$ is an alkoxy group having 1 to 5 carbon atoms and the remainder thereof is an alkyl group having 1 to 10 carbon atoms), and in the epoxy resin, n:1 which is a molar concentration ratio of [epoxy group]:[alkoxysilyl group] is 2:1 to 10:1.

The epoxy compounds having an alkoxysilyl group of the above patent applications of the present applicant have been exemplified as a silylated epoxy resin which may be used in the present disclosure, but is not limited thereto, and any epoxy resin having an alkoxysilyl group may be used as an main epoxy resin in the epoxy composition of the present disclosure.

The silylated epoxy resin may be, for example, an epoxy resin having at least one alkoxysilyl group in a non-silylated epoxy resin described later, and the alkoxysilyl group may correspond to an alkoxysilyl group in the epoxy compound having an alkoxysilyl group which is defined in the above-described patent applications.

Without being limited thereto, it is preferable that the silylated epoxy resin has, for example, an epoxy equivalent weight (EEW) of 100 g/Eq to 500 g/Eq. When EEW is less than 100 g/Eq, a curing reaction rate is too high, and when EEW is more than 500 g/Eq, a concentration of an epoxide functional group is low, so that it is difficult to secure sufficient thermal properties.

In addition, as the silylated epoxy resin, for example, the epoxy compound having an alkoxysilyl group may be used alone or in combination of two or more.

The non-silylated epoxy resin is not particularly limited, and may be any epoxy resin which is conventionally known in the art as an epoxy resin having no alkoxysilyl group.

Without being limited thereto, it is preferable that the non-silylated epoxy resin has, for example, an epoxy equivalent weight (EEW) of 100 g/Eq to 500 g/Eq. When EEW is less than 100 g/Eq, a curing reaction rate is too high, and when EEW is more than 500 g/Eq, a concentration of an epoxide functional group is low, so that it is difficult to secure sufficient thermal properties.

The non-silylated epoxy resin may be at least one kind selected from the group consisting of glycidyl ether-based epoxy resins, glycidyl-based epoxy resins, glycidyl amine-based epoxy resins, and glycidyl ester-based epoxy resins. Furthermore, the non-silylated epoxy resin may be at least one selected from the group consisting of glycidyl ether-based epoxy resins, glycidyl-based epoxy resins, glycidyl amine-based epoxy resins, and glycidyl ester-based epoxy resins having a bisphenol, biphenyl, naphthalene, benzene, thiodiphenol, fluorene, anthracene, isocyanurate, triphenyl-methane, 1,1,2,2-tetraphenylethane, tetraphenylmethane, 4,4'-diaminodiphenylmethane, aminophenol, cycloaliphatic, aliphatic, or novolac unit, as a core structure.

Preferably, the common non-silylated epoxy resin may be at least one selected from the group consisting of glycidyl ether-based epoxy resins, glycidyl-based epoxy resins, glycidyl amine-based epoxy resins, glycidyl ester-based epoxy resins, aliphatic polyglycidyl-based epoxy resins, and aliphatic glycidyl amine-based epoxy resins having a bisphenol A, bisphenol F, bisphenol S, biphenyl, naphthalene, benzene, thiodiphenol, fluorene, anthracene, isocyanurate, triphenylmethane, 1,1,2,2-tetraphenylethane, tetraphenylmethane, 4,4'-diaminodiphenylmethane, aminophenol, cycloaliphatic, or novolac unit, as a core structure.

In the main epoxy resin, a mole ratio of functional groups of [epoxide group]:[alkoxysilyl group] is 1:0.05 to 0.5, preferably 1:0.1 to 0.4. Within the range of the mole ratio, a desired low thermal expansion property is secured, and also, sufficient processability may be achieved. When a mole ratio of an alkoxysilyl group is less than 0.05 which is a lower limit, it is difficult to secure the low thermal expansion property, and when the mole ratio is more than 0.5 which is an upper limit, it is difficult to secure sufficient processability. Therefore, the mole ratio of [epoxide group]:[alkoxysilyl group] in the main epoxy resin is a mole ratio of [epoxide group]:[alkoxysilyl group] in the silylated epoxy resin alone (where the silylated epoxy resin is used alone as the main epoxy resin) or an epoxy mixture (where the epoxy mixture is used as the main epoxy resin). Accordingly, when the epoxy mixture is used as the main epoxy resin, the silylated epoxy resin and the non-silylated epoxy resin are mixed so that a mole ratio of [epoxide group]:[alkoxysilyl group] is to be 1:0.05 to 0.5, preferably 1:0.1 to 0.4 in the epoxy mixture.

The epoxy composition according to an exemplary embodiment of the present disclosure comprises an acrylic-based polymer resin as an enhancer for improving the thermal expansion property of the silylated epoxy resin in the composite.

The acrylic-based polymer resin used as the enhancer for improving the thermal expansion property may be a polymer resin prepared at least one monomer selected from the group consisting of ethyl acrylate, butyl acrylate, and acrylonitrile. That is, the acrylic-based polymer resin may be a polymer resin prepared monomer comprising, essentially consisting of, or consisting of at least one selected from the group consisting of ethyl acrylate, butyl acrylate, and acrylonitrile. In addition, the acrylic-based polymer resin may be a polymer resin prepared by further comprising an acryl monomer commonly used in the art as a comonomer for adjusting a molecular weight, a glass transition temperature, and the like of the acrylic-based polymer resin.

However, it is not preferable that a carboxylic acid group is present in the structure of a final acrylic-based polymer resin. The structure with a carboxylic acid group may include, without being limited thereto, for example, structures derived from an acrylic acid, a methacrylic acid, and the like. The structure with a carboxylic acid group hinders with an epoxy curing reaction.

It is preferable that the acrylic-based polymer resin has a weight average molecular weight (Mw) of 150,000 to 1,000,000, preferably 400,000 to 800,000, in terms of improvement in reactivity of an alkoxysilyl functional group and a composite processability. When Mw is less than 150,000, the contribution to improvement in reactivity of an alkoxysilyl group is insignificant so that improvement in the physical properties, that is, the thermal expansion property of the composite is not shown. When Mw is more than 1,000,000, the viscosity is increased so that the process is not easily performed.

The acrylic-based polymer resin has a glass transition temperature (Tg) of −40° C. to 40° C., preferably −20° C. to 20° C., in terms of processability, a low thermal expansion property, and/or improvement in reactivity of an alkoxysilyl functional group. When Tg is lower than −40° C., the processing is not easy and it is difficult to secure a sufficient low thermal expansion property. When Tg is higher than 40° C., the effect of improving reactivity of an alkoxysilyl group is insignificant, so that the thermal expansion property is not improved.

Meanwhile, it is not preferred to use a thermoplastic polymer such as a phenoxy resin, a polyvinyl acetal resin, a polyimide resin, a polyamideimide resin, a polyethersulfone resin, and a polysulfone resin, conventionally commonly used in the epoxy resin composition. Even when the thermoplastic polymer is used, any improvement of thermal expansion properties in a composite may not be expected therefrom. In addition, an acrylic-based rubber, an acrylonitrile butadiene rubber, a butadiene rubber, a core-shell type rubber, a crosslinked acrylonitrile butadiene rubber, a crosslinked styrene butadiene rubber, and the like are not preferred for the epoxy composition and the composite intended in the present disclosure.

A content of the acrylic-based polymer resin in the epoxy composition of the present disclosure is in a range of 0.5 wt % to 10 wt %, based on a total weight of a solids content of the epoxy composition. The acrylic-based polymer resin is added so as to improve reactivity of an alkoxysilyl group in a composite interface, and thus, improve the thermal expansion property (that is, to decrease CTE) in the composite, but when the content is out of the range, the thermal expansion property of the composite may deteriorate (increased a CTE value). When a lower limit of the content of the acrylic-based polymer resin is less than 0.5 wt %, an reactivity improvement of an alkoxysilyl group may not be expected, and when an upper limit thereof is more than 10 wt %, a concentration of an epoxy curing network which is important for low thermal expansion properties is decreased. In the same purpose, a content of the acrylic-based polymer resin in the entire epoxy composition is preferably 1.0 wt % to 8.0 wt %, more preferably 2.0 wt % to 6.0 wt %, based on a total weight of a solids content of the epoxy composition.

Furthermore, improvement of an alkoxysilyl reactivity by the acrylic-based polymer resin is to enhance an interfacial reaction with an inorganic filler while composite is prepared, and the epoxy composition by the present disclosure comprises the inorganic filler. As the inorganic filler, any inorganic filler commonly used in the art may be used.

Without being limited thereto, for example, as the inorganic filler, any inorganic filler which is known to be conventionally used for reinforcing the physical properties of an epoxy resin, may be used. Specifically, without being limited thereto, for example, the inorganic filler may be at least one selected from the group consisting of metal oxides such as silica (for example, including a fused silica and a crystalline silica), zirconia, titania, and alumina, silicon nitride and aluminum nitride, and silsesquioxane. The inorganic filler may be used alone or in combination of two or more.

It is preferred to use spherical powder having a particle size (cut-size) of 0.1 μm to 100 μm, preferably 1 μm to 70 μm, and more preferably 5 μm to 50 μm, as the inorganic filler, in terms of dispersibility, processability, reliability, and so on. The inorganic filler with an average particle diameter of less than 0.1 μm are not only expensive, but also may have problems with dispersion. The inorganic filler having an average particle diameter of more than 100 μm may cause problems such as pattern damage or cracks in the controller die and/or semiconductor chip due to the inorganic filler.

It is preferable that the inorganic filler is added at 30 wt % to 90 wt %, based on a total weight of the solids content of the epoxy composition, in consideration of the properties and processability. When it is added at less than 30 wt %, the sufficient properties are not achieved by the inorganic filler, and when it is added at more than 90 wt %, it is difficult to assure a processability. The content of a inorganic filler is preferably 45 wt % to 90 wt %, and more preferably 60 wt % to 90 wt %, based on the total weight of the solids content of the epoxy composition.

In another exemplary embodiment of the present disclosure, the epoxy composition comprises a curing agent. As the curing agent, any curing agent generally known as a curing agent for an epoxy resin may be used, and without being limited thereto, for example, amine-based, polyphenol-based, acid anhydride-based agents, and so on may be used.

More specifically, without being limited thereto, as the amine-based curing agent, an aliphatic amine, a cycloaliphatic amine, an aromatic amine, other amine, and a modified polyamine may be used, and an amine compound including two or more primary amine groups may be used. A specific example of the amine-based curing agent may include one or more aromatic amines selected from the group consisting of 4,4'-dimethylaniline (diaminodiphenyl methane, DAM or DDM), diamino diphenyl sulfone (DDS), and m-phenylene diamine, at least one or more aliphatic amines selected from the group consisting of diethylene triamine (DETA), diethylene tetramine, triethylene tetramine (TETA), m-xylene diamine (MXDA), methane diamine (MDA), N,N'-diethylenediamine (N,N'-DEDA), tetraethylenepentamine (TEPA), and hexamethylenediamine, one or more cycloaliphatic amines selected from the group consisting of isophorone diamine (IPDI), N-aminoethyl piperazine (AEP), and bis(4-amino 3-methylcyclohexyl)methane (Larominc 260), other amines such as dicyanamide (DICY), and modified amines such as polyamide-based and epoxide-based amines.

Without being limited thereto, an example of the polyphenol-based curing agent may include a phenol novolac resin, a trifunctional phenol novolac resin, a cresol novolac resin, a bisphenol A novolac resin, a xylene novolac resin, a triphenyl novolac resin, a biphenyl-based novolac resin, a dicyclopentadiene novolac resin, a naphthalene-based novolac resin, a phenol p-xylene resin, a phenol 4,4'-dimethylbiphenylene resin, a phenol dicyclopentadiene novolac resin, a dicyclopentadiene-phenol novolac (DCPD-phenol), xylok (p-xylene modified), a triazine-based compound, dihydroxy naphthalene, dihydroxy benzene, and the like.

Without being limited thereto, an example of the acid anhydride curing agent may include aliphatic acid anhydrides such as dodecenyl succinic anhydride (DDSA) and poly azelaic poly anhydride, cycloaliphatic acid anhydrides such as hexahydrophthalic anhydride (HHPA), methyl tetrahydrophthalic anhydride (MeTHPA), and methylnadic anhydride (MNA), aromatic acid anhydrides such as a trimellitic anhydride (TMA), a pyromellitic acid dianhydride (PMDA), and a benzophenonetetracarboxylic dianhydride (BTDA), halogen acid anhydrides such as a tetrabromophthalic anhydride (TBPA) and a chlorendic anhydride, and the like.

Generally, the crosslinking density of an epoxy composite may be adjusted by a extent of reaction of the curing agent and an epoxide group (epoxy group), and the content of a curing agent may be adjusted, based on a epoxide concentration of the epoxy resin, depending on a desired range of crosslinking density. Specifically, it is preferred to use the curing agent by adjusting the content of the curing agent so that an equivalent ratio of 'epoxide group': reactive group of curing agent is 1:0.5 to 2.0, preferably 1:0.8 to 1.5. The reactive group of the curing agent (toward an epoxide group) is an amine group in an amine-based catalyst and a phenolic hydroxyl group in a polyphenol-based catalyst, and is commonly known in the art.

The epoxy composition by another exemplary embodiment of the present disclosure may further optionally comprise a curing catalyst, if necessary, so as to catalyze a curing reaction.

As the curing catalyst, any curing catalyst known to be commonly used in the art for curing of the epoxy composition may be used, and without being limited thereto, for example, curing catalysts such as imidazole-based, tertiary amine-based, quaternary ammonium-based, organic acid salt-based, and phosphorus-based compounds may be used.

More specifically, examples of the curing catalyst may include imidazole-based compounds such as dimethylbenzyl amine, 2-methylimidazole (2MZ), 2-undecylimidazole, 2-ethyl-4-methylimidazole (2E4M), 2-phenylimidazole, 1-(2-cyanoethyl)-2-alkyl group imidazole, and 2-heptadecylimidazole (2HDI); tertiary amine-based compounds such as benzyl dimethyl amine (BDMA), trisdimethylaminomethylphenol (DMP-30), and triethylenediamine; quaternary ammonium salts such as tetrabutylammonium bromide; diazabicycloundecene (DBU) or an organic acid salt of DBU; phosphorus-based compounds such as triphenylphosphine and phosphoric acid ester; Lewis acids such as $BF_3$-monoethyl amine ($BF_3$-MEA); and the like may be included, but are not limited thereto. As the curing catalysts, those latentized by microcapsule coating, complex salt formation, and the like may be also used. These may be used alone or in combination of two or more.

A content of the curing catalyst is not particularly limited, and may be added and used in an amount commonly used in the art. For example, the content of the curing catalyst may be 0.1 to 10 phr (parts per hundred resin, parts per 100 parts of the main epoxy resin by weight), for example, 0.2 to 5 phr, with respect to the main epoxy resin. It is preferable that the curing catalyst is used at the content described above in terms of catalyzation of curing reaction and control of curing reaction rate. By using the curing catalyst in the above content range, curing may be effectively catalyzed and improvement in a throughput may be expected.

The epoxy composition according to an exemplary embodiment of the present disclosure may be added with other additives such as a flame retardant, a plasticizer, an antimicrobial agent, a leveling agent, an antifoaming agent, a colorant, a stabilizer, a coupling agent, a viscosity adjusting agent, a diluent, and a curing catalyst, if necessary, which are commonly added into the epoxy composition in the art for adjusting the properties of the composition, within a concentration range where properties of the composition are not deteriorated. The addition of the additive is commonly known to a technician in the art, and is not described in detail in the present specification.

As described above, the epoxy composition according to an exemplary embodiment of the present disclosure comprising: (1) the main epoxy resin, (2) the acrylic-based polymer resin, (3) the inorganic filler, (4) the curing agent, and optionally, (5) the curing catalyst, comprises 0.5 wt % to 10 wt % of the (2) acrylic-based polymer resin and 30 wt % to 90 wt % of the (3) inorganic filler, based on the total weight of the solids content of the epoxy composition, and the remainder is the solids contents of the main epoxy resin, the curing agent, the optional curing catalyst, and other additives which may be added as required (hereinafter, referred to as a "balance weight"). That is, the epoxy composition according to an exemplary embodiment of the present disclosure is added so that a total amount of the acrylic-based polymer resin, the inorganic filler, and components forming the balance weight (a solids content, based on a weight) is 100 wt %.

The meaning of "total weight of the solids content of the epoxy composition" in the present application is, when a liquid component is incidentally present in the epoxy composition and/or a solvent is used for dissolution of each component of the epoxy composition for mixing each component, a total weight of the solids content of the epoxy composition to be cured after any liquid component such as the solvent is removed.

As described above, the main epoxy resin and the curing agent may be added so that the equivalent ratio of [epoxide group]:[reactive group of curing agent] is 1:0.5 to 2.0, preferably 1:0.8 to 1.5, in the balance weight. In addition, the optional curing catalyst may be 0.1 to 10 phr (parts per hundred resin, parts per 100 parts of the main epoxy resin by weight), for example, 0.2 to 5 phr, with respect to the main epoxy resin, in the balance weight.

According to another embodiment of the present disclosure, a composite of the epoxy composition according to an exemplary embodiment of the present disclosure is provided. The composite may be prepared from the epoxy composition according to an exemplary embodiment of the present disclosure by the preparation method of an epoxy composite commonly used in the art. For example, the composite may be prepared by curing the epoxy composition. That is, the term used in the present specification, "composite" means a "cured composite" obtained by curing the epoxy composition. A curing condition is not particularly limited, and may be applied appropriately by a person skilled in the art by selecting the curing conditions commonly applied in the art. A method of forming the composite, the curing condition and so on may be appropriately selected from the knowledges commonly known to a technician in the art and applied by a person skilled in the art, and are not separately described in the present specification.

According to another embodiment of the present disclosure, an article including the epoxy composition and/or the composite of the present disclosure disclosed above is provided. The article may be a semiconductor material, a semiconductor component, a semiconductor device, an electrical and electronic material, an electrical and electronic component, an electrical and electronic device and the like. The semiconductor device may include the semiconductor material and/or the semiconductor component, and the electrical and electronic device may include the electrical and electronic material and/or the electrical and electronic component. The composite according to an exemplary embodiment of the present disclosure has an improved low thermal expansion property, specifically a low CTE value due to the acrylic-based polymer resin which is used as an enhancer for improving the thermal expansion in the epoxy composition. Therefore, the epoxy composition and the composite according to the present disclosure may be applied to packaging of a semiconductor device, semiconductors, and/or electrical and electronic materials, components, devices, and the. The "packaging" used in the present application has a meaning of including sealing and encapsulation. Specifically, the composite of the present disclosure may be used for, for example, an application requiring the low thermal expansion property such as an epoxy molding compound (EMC) for a semiconductor device and an underfill, but is not limited thereto. In addition, the composite according to an embodiment of the present disclosure may be a film. However, the epoxy composition according to an exemplary embodiment of the present disclosure and the composite thereof uses a composition having a low content of the acrylic-based polymer resin and a high content of the inorganic filler, and thus, is not appropriate for being used as a die attach film (DAF, die bonding film) and the like requiring adhesive performance.

Example

Hereinafter, the present disclosure will be described in detail through the following examples. The following examples are illustrative of the present disclosure and do not limit the scope of the present disclosure.

Evaluation of Properties: Preparation of Composite and Measurement of Thermal Expansion Property (1) Preparation of Epoxy Filler Composite (Cured Product)

The composition given in the following Table 1, i.e., an epoxy resin, an acrylic-based polymer resin, a silica, and a wax were dissolved in methyl ethyl ketone. The solids content of mixed solution was 80 wt %. After the mixture was mixed for 20 minutes, a curing agent was added and further mixed for 10 minutes, and then a curing catalyst was added and further mixed for 10 minutes to obtain a homogeneous solution. After casting the mixture on copper foil, the solvent was removed in a convection oven heated to 70° C. for 30 minutes. The dried sample was cured in an oven at 180° C. to prepare a testing specimen with the dimension of 4 mm×40 mm×0.1 mm (mmd), and the properties were determined using the film mode.

(2) Characterization of Thermal Expansion Property

The dimensional changes with the temperature of the cured product in the Examples and Comparative Examples of Table 1 were characterized using a thermo-mechanical analyzer and the results are shown in Table 1 below:

TABLE 1

Composition and thermal expansion property of filler composite

| | | Compound | Example 1 | Example 2 | Example 3 | Example 4 | Example 5 | Example 6 | Example 7 |
|---|---|---|---|---|---|---|---|---|---|
| | | Characteristics of Example/Comparative Example | 4.9 wt % acryl | 3.2 wt % acryl | 1.6 wt % acryl | 4.9 wt % acryl | 4.9 wt % acryl | 3.2 wt % acryl | 1.6 wt % acryl |
| Formulations (g) | Epoxy | Silylated epoxy 1[(1)] (g) | 3.00 | 3.00 | 3.00 | 1.7 | — | — | — |
| | | Silylated epoxy 2[(2)] (g) | | — | | — | 3.00 | 3.00 | 3.00 |
| | | Non-silylated epoxy[(3)] (g) | | — | | 1.3 | — | — | — |
| | | HF-1M[(4)] (g) | 0.89 | 0.89 | 0.89 | 1.25 | 0.92 | 0.92 | 0.92 |

TABLE 1-continued

Composition and thermal expansion property of filler composite

|  |  |  |  |  |  |  |  |  |  |
|---|---|---|---|---|---|---|---|---|---|
|  |  | Curing catalyst[5] (g) | 0.03 | 0.03 | 0.03 | 0.03 | 0.03 | 0.03 | 0.03 |
|  | Poly- | Acryl 1[6] (g) | 1.28 | 0.75 | 0.34 | 1.28 | 1.28 | 0.75 | 0.34 |
|  | mer | Acryl 2[7] (g) | — |  |  |  |  |  |  |
|  | additive | Acryl 3[8] (g) | — |  |  |  |  |  |  |
|  |  | Polyvinylbutyral[9] (g) |  |  |  |  |  |  |  |
|  |  | Phenoxy[10] (g) |  |  |  |  |  |  |  |
|  |  | Silica[11] (g) | 20.8 | 18.62 | 17.04 | 22.4 | 20.92 | 18.8 | 17.16 |
| Thermal | CTE | $\alpha_1$ (T < $T_g$) | 5.1 | 5.9 | 8.3 | 6.0 | 6.1 | 7.0 | 9.2 |
| Expansion | (ppm/ | $\alpha_2$ (T > $T_g$) | 8.2 | 8.8 | 15.1 | 11.3 | 9.2 | 12.4 | 17.4 |
| property | °C.) |  |  |  |  |  |  |  |  |

|  |  | Compound | Comparative Example 1 | Comparative Example 2 | Comparative Example 3 | Comparative Example 4 | Comparative Example 5 |
|---|---|---|---|---|---|---|---|
|  |  | Characteristics of Example/Comparative Example | 5.4 wt % acryl | 4.0 wt %- acryl | 1.7 wt % acryl | 5.4 wt % PVB | 5.4 wt % phenoxy |
| Formulations | Epoxy | Silylated epoxy 1[1] (g) | — | — | — | — | — |
| (g) |  | Silylated epoxy 2[2] (g) | — | — | — | — | — |
|  |  | Non-silylated epoxy[3] (g) | 3.00 | 3.00 | 3.00 | 3.00 | 3.00 |
|  |  | Curing agent[4] (g) | 1.6 | 1.6 | 1.6 | 1.6 | 1.6 |
|  |  | Curing catalyst[5] (g) | 0.03 | 0.03 | 0.03 | 0.03 | 0.03 |
|  | Poly- | Acryl 1[6] (g) | 1.28 | 0.75 | 0.34 | — | — |
|  | mer | Acryl 2[7] (g) | — | — | — | — | — |
|  | additive | Acryl 3[8] (g) | — | — | — | — | — |
|  |  | Polyvinylbutyral[9] (g) | — | — | — | 1.28 | — |
|  |  | Phenoxy[10] (g) | — | — | — | — | 1.28 |
|  |  | Silica[11] (g) | 23.64 | 18.52 | 19.88 | 23.64 | 23.64 |
| Thermal | CTE | $\alpha_1$ (T < $T_g$) | 15.6 | 13 | 12.3 | 12 | 13.4 |
| Expansion | (ppm/ | $\alpha_2$ (T > $T_g$) | 40.3 | 34.3 | 29.5 | 29.4 | 28.4 |
| property | °C.) |  |  |  |  |  |  |

|  |  | Compound | Comparative Example 7 | Comparative Example 8 | Comparative Example 9 | Comparative Example 10 | Comparative Example 11 |
|---|---|---|---|---|---|---|---|
|  |  | Characteristics of Example/Comparative Example | 0.48 wt % acryl | Small Mw of acrylic-based polymer resin | Acryl having acid functional group | 3.2 wt % PVB | 3.2 wt % phenoxy |
| Formulations | Epoxy | Silylated epoxy 1[1] (g) | 3.00 | 3.00 | 3.00 | 3.00 | 3.00 |
| (g) |  | Silylated epoxy 2[2] (g) | — | — | — | — | — |
|  |  | Non-silylated epoxy[3] (g) | — | — | — | — | — |
|  |  | HF-1M[4] (g) | 0.89 | 0.89 | 0.89 | 0.89 | 0.89 |
|  |  | Curing catalyst[5] (g) | 0.03 | 0.03 | 0.03 | 0.03 | 0.03 |
|  | Poly- | Acryl 1[6] (g) | — | — | — | — | — |
|  | mer | Acryl 2[7] (g) | — | 0.75 | — | — | — |
|  | additive | Acryl 3[8] (g) | — | — | 0.75 | — | — |
|  |  | Polyvinylbutyral[9] (g) | — | — | — | 0.75 | — |
|  |  | Phenoxy[10] (g) | — | — | — | — | 0.75 |
|  |  | Silica[11] (g) | 15.68 | 18.62 | 18.62 | 18.62 | 18.62 |
| Thermal | CTE | $\alpha_1$ (T < $T_g$) | Difficult to prepare sample | 9.0 | 12 | 9.1 | 9.0 |
| Expansion | (ppm/ | $\alpha_2$ (T > $T_g$) |  | 20.0 | 31.1 | 19.5 | 21.6 |
| property | °C.) |  |  |  |  |  |  |

(In the epoxy resin composition of Exampe 4, a mole ratio of [epoxide group]: [alkoxysilyl group] was 1:0.0.)

Note:

The compounds used in Table 1 were as follows:

[1]Silylated epoxy resin 1: Cresol novolac, EEW 361 g/eq, [epoxide group]:[alkoxysilyl group] = 1:0.25 (mole ratio)

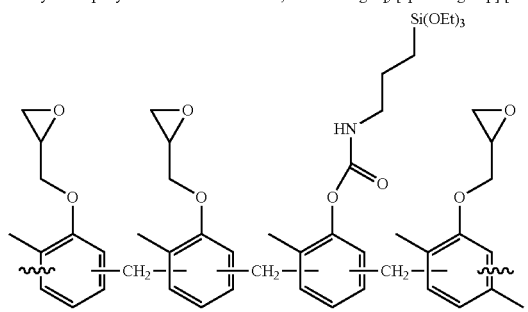

TABLE 1-continued

Composition and thermal expansion property of filler composite

[2] Silylated epoxy resin 2: Bisphenol novolac, EEW 348 g/eq, [epoxide group]:[alkoxysilyl group] = 1:0.25 (mole ratio)

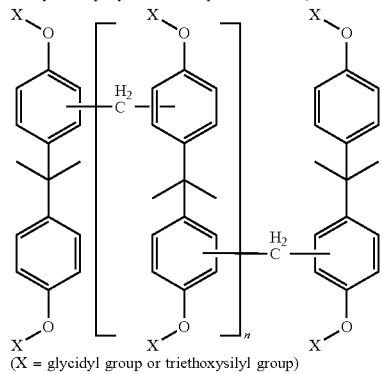

(X = glycidyl group or triethoxysilyl group)
[3] Non-silylated epoxy resin: Cresol novolac, YDCN-500-80P (EEW = 200)
[4] Curing agent: Phenol novolac-based curing agent (Meiwa Plastic Industries, HEW = 107)
[5] Curing catalyst: Imidazole-based catalyst (Cresol, 2P4 MHZ Shikoku)
[6] Acryl 1 (Nagase ChemteX Corporation, Mw = 350,000, Tg = 11° C., acid value = 0)
[7] Acryl 2 (Samhwa Paint Industrial Co., Ltd., Mw = 100,000, Tg = 10° C., acid value = 0)
[8] Acryl 3 (Nagase ChemteX Corporation, Mw = 700,000, Tg = 4° C., acid value = 9 mg KOH/g)
[9] Polyvinylbutyral resin (Mw = 130, 000, Tg = 70° C.)
[10] Phenoxy resin (KUKDO CHEMICAL CO., LTD., Mw = 60,000, Tg = 86° C.)
[11] Silica: Denka, spherical fused silica, 20 μm cut If it is considered the physical properties of acrylic-based polymer resins which are generally known as soft, flexible resins with a low glass transition temperature, it is likely that the mixture becomes flexible and the thermal expansion properties are lowered, when acrylic-based polymer resins are added. As shown in Comparative Examples 1 to 3 of Table 1, when an acrylic-based polymer resin is added into a composition comprising the non-silylated epoxy resin, as predicted from the known physical properties of the acrylic-based polymer resin, better thermal expansion resistance, that is, a lower CTE value is observed with the lower content of the acrylic polymer. Furthermore, as shown in Comparative Examples 4 and 5, a composition comprising the non-silylated epoxy resin exhibited a better thermal expansion property, that is, lower CTE, when a polyvinylbutyral resin and a phenoxy resin having high Tg were added.

However, surprisingly, as shown in the above Table 1, in Examples 1 to 7 comprising the silylated epoxy resin, as the content of the acrylic-based polymer resin in the composition was increased, the thermal expansion property was improved. That is, lower CTE was obtained. Namely, in the composition according to the present invention, the discovery that a specific acrylic-based polymer resin improves the interfacial reaction between the alkoxysilyl group and the inorganic filler is contrary to the properties of the conventionally expected acrylic-based polymer resin.

In addition, even in the case of the silylated epoxy resin, a cured composite was not prepared in Comparative Example 7 having a small content of the acrylic-based polymer resin. Further, an epoxy composition comprising an acrylic-based polymer resin having a small Mw (Comparative Example 8) or an acrylic-based polymer resin having an acid functional group (Comparative Example 9) exhibited a high CTE representing a poor thermal expansion property. Besides, in the composition comprising the silylated epoxy resin, when a phenoxy resin and a polyvinylbutyral resin having high Tg were added (Comparative Examples 10 and 11), a rather poor thermal expansion property (that is, high CTE value) was shown, which is also contrary to the case of the non-silylated epoxy resin.

Meanwhile, FIG. 1 shows dimensional change (thermal expansion property) with temperature of the composite, and it was found that the epoxy composition of Example 1 according to the present disclosure showed a much superior thermal expansion property to that of Comparative Example 1 including a similar content of the acrylic-based polymer resin.

A specific acrylic-based polymer resin plays the role in improving the interfacial reaction between an alkoxysilyl group and an inorganic filler, when a composite of an epoxy compound having an alkoxysilyl group is prepared. By the action of the specific acrylic-based polymer resin, the epoxy composition comprising an epoxy resin having an alkoxysilyl group and a specific acrylic-based polymer resin according to the present disclosure exhibits excellent thermal expansion properties, specifically low CTE, when a composite is cured. Therefore, the epoxy composition of the present disclosure may be prepared as a composite having an excellent low thermal expansion property. The epoxy composition and the composite of the present disclosure are appropriate for being used for semiconductor packaging and/or electrical and electronic components.

While exemplary embodiments have been shown and described above, it will be apparent to those skilled in the art that modifications and variations could be made without departing from the scope of the present invention as defined by the appended claims.

What is claimed is:
1. An epoxy molding compound (EMC) for a semiconductor device, the EMC comprising:
   an epoxy component including an epoxy resin having one or more alkoxysilyl functional groups and two or more epoxide groups;
   a curing agent;
   an acrylic-based polymer resin; and
   an inorganic filler,
   wherein the EMC includes 0.5 to 10 wt % of the acrylic-based polymer resin and 30 to 90 wt % of the inorganic filler based on a total weight of a solids content of the EMC, and wherein a mole ratio of epoxide groups to alkoxysilyl groups in the epoxy component is from 1:0.1 to 0.5, wherein the EMC does not contain an acrylic-based rubber, an acrylonitrile butadiene rubber, a core-shell type rubber, or a crosslinked acrylonitrile butadiene rubber.

2. The EMC of claim 1, wherein the acrylic-based polymer resin has a glass transition temperature of −40 to 40° C.

3. The EMC of claim 2, wherein the acrylic-based polymer resin has a glass transition temperature of −20 to 20° C.

4. The EMC of claim 1, wherein the acrylic-based polymer resin is a polymer of at least one monomer selected from the group consisting of ethyl acrylate, butyl acrylate, and acrylonitrile and has a weight average molecular weight (Mw) of 150,000 to 1,000,000.

5. The EMC of claim 1, wherein the acrylic-based polymer resin has a weight average molecular weight (Mw) of 400,000 to 800,000.

6. The EMC of claim 1, wherein the acrylic-based polymer resin is present in an amount of from 2.0 to 6.0 wt %, based on a total weight of a solids content of the EMC.

7. The EMC of claim 1, wherein the inorganic filler includes at least one of silica and alumina.

8. The EMC of claim 1, wherein the inorganic filler is present in an amount of 60 to 90 wt % based on a total weight of a solids content of the EMC.

9. The EMC of claim 1, wherein the inorganic filler is a powder having a particle size of 0.1 μm to 100 μm.

10. The EMC of claim 1, wherein the inorganic filler is a powder having a particle size of 1 μm to 70 μm.

11. An epoxy composite material comprising:
an epoxy component including an epoxy resin having one or more alkoxysilyl functional groups and two or more epoxide groups;
a curing agent;
an acrylic-based polymer resin having a weight average molecular weight (Mw) of 150,000 to 1,000,000 and a glass transition temperature of −40 to 40° C.; and
an inorganic filler,
wherein the epoxy composite material includes 0.5 to 10 wt % of the acrylic-based polymer resin and 45 to 90 wt % of the inorganic filler based on a total weight of a solids content of the epoxy composite material,
wherein a mole ratio of epoxide groups to alkoxysilyl groups in the epoxy component is from 1:0.05 to 0.5, and
wherein the epoxy composite material does not contain an acrylic-based rubber, an acrylonitrile butadiene rubber, a core-shell type rubber, or a crosslinked acrylonitrile butadiene rubber.

12. The epoxy composite material of claim 11, wherein a mole ratio of epoxide groups to alkoxysilyl groups in the epoxy component is from 1:0.1 to 0.4.

13. The epoxy composite material of claim 11, wherein the inorganic filler is present in an amount of 60 to 90 wt % based on a total weight of a solids content of the epoxy composite material.

14. The epoxy composite material of claim 11, wherein the acrylic-based polymer resin is present in an amount of from 2.0 to 6.0 wt %, based on a total weight of a solids content of the epoxy composite material.

15. The epoxy composite material of claim 11, wherein the acrylic-based polymer resin has a glass transition temperature of −40 to 20° C.

16. An electronic device including the epoxy composite material of claim 11.

17. An epoxy composite material comprising:
an epoxy component including an epoxy resin having one or more alkoxysilyl functional groups and two or more epoxide groups;
a curing agent;
an acrylic-based polymer resin having a weight average molecular weight (Mw) of 150,000 to 1,000,000 and a glass transition temperature of −40 to 40° C.; and
an inorganic filler,
wherein the epoxy composite material includes 0.5 to 10 wt % of the acrylic-based polymer resin and 45 to 90 wt % of the inorganic filler based on a total weight of a solids content of the epoxy composite material,
wherein a mole ratio of epoxide groups to alkoxysilyl groups in the epoxy component is from 1:0.1 to 0.5, and
wherein the epoxy composite material does not contain an acrylic-based rubber, an acrylonitrile butadiene rubber, a core-shell type rubber, or a crosslinked acrylonitrile butadiene rubber.

* * * * *